US012511034B2

(12) United States Patent
Weber

(10) Patent No.: US 12,511,034 B2
(45) Date of Patent: *Dec. 30, 2025

(54) INK DATA GENERATION APPARATUS, METHOD, AND PROGRAM

(71) Applicant: Wacom Co., Ltd., Saitama (JP)

(72) Inventor: Markus Weber, Dusseldorf (DE)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/884,010

(22) Filed: Sep. 12, 2024

(65) Prior Publication Data

US 2025/0004632 A1 Jan. 2, 2025

Related U.S. Application Data

(63) Continuation of application No. 18/358,775, filed on Jul. 25, 2023, now Pat. No. 12,118,203, which is a (Continued)

(30) Foreign Application Priority Data

Nov. 2, 2018 (JP) ................................ 2018-207701

(51) Int. Cl.
*G06F 3/04883* (2022.01)
*G06F 3/0354* (2013.01)
*G06F 3/04847* (2022.01)

(52) U.S. Cl.
CPC ...... *G06F 3/04883* (2013.01); *G06F 3/03545* (2013.01); *G06F 3/04847* (2013.01)

(58) Field of Classification Search
CPC ............. G06F 3/03545; G06F 3/04847; G06F 3/04883
See application file for complete search history.

(56) References Cited

U.S. PATENT DOCUMENTS 10,296,787 B2 5/2019 Angelov et al.
2015/0146985 A1 5/2015 Nakasu et al.
(Continued)

FOREIGN PATENT DOCUMENTS

CN 104541288 A 4/2015
CN 105745608 A 7/2016
(Continued)

OTHER PUBLICATIONS

Chinese Office Action dated Nov. 1, 2023, for the corresponding Chinese Patent Application No. 201980061745.X, 22 pages. (With English Translation).
(Continued)

*Primary Examiner* — Michael Pervan
(74) *Attorney, Agent, or Firm* — Seed Intellectual Property Law Group LLP

(57) ABSTRACT

Provided are an ink data generation apparatus, an ink data generation method, and an ink data generation program that are capable of improving ease of handling ink data when or after metadata is generated. An ink data generation apparatus performs a determination as to an inclusion relation between a first set and a second set by comparing stroke elements of first set data and stroke elements of second set data using the first set data and the second set data. The ink data generation apparatus generates first metadata for the first set described in a form that varies in accordance with a result of the determination.

11 Claims, 20 Drawing Sheets

Related U.S. Application Data continuation of application No. 17/196,876, filed on Mar. 9, 2021, now Pat. No. 11,755,195, which is a continuation of application No. PCT/JP2019/039463, filed on Oct. 7, 2019.

(56) References Cited

U.S. PATENT DOCUMENTS

| | | | |
|---|---|---|---|
| 2015/0154442 | A1 | 6/2015 | Takahashi et al. |
| 2016/0224239 | A1 | 8/2016 | Angelov et al. |
| 2016/0292500 | A1 | 10/2016 | Angelov et al. |
| 2017/0199660 | A1 | 7/2017 | Guiavarc'H et al. |
| 2021/0191613 | A1 | 6/2021 | Weber |

FOREIGN PATENT DOCUMENTS

| | | | |
|---|---|---|---|
| CN | 108700994 | A | 10/2018 |
| JP | H08263682 | A | 10/1996 |
| JP | 2014038384 | A | 2/2014 |
| JP | WO2020090356 | A1 | 10/2021 |
| WO | 2016157400 | A1 | 10/2016 |

OTHER PUBLICATIONS

German Office Action, dated Feb. 2, 2022, for German Application No. 11 2019 005 487.2, 10 pages. (with English translation).
International Search Report, mailed Nov. 19, 2019, for International Application No. PCT/JP2019/039463, 1 page.
Japanese Office Action, dated May 21, 2024, for Japanese Patent Application No. 2023- 131047, 6 pages. (with English translation).
Japanese Office Action, dated May 23, 2023, for Japanese Application No. 2021-119352. (8 pages) (with English translation).

```
<ink xmlns="http://www.w3.org/2003/InkML">
  <traceGroup xml:id="g0">
    <trace> 15 14, ---------------, 21 12 </trace>   : stroke #01
    <trace> 20 13, ---------------, 22 25 </trace>   : stroke #02
    <trace> 28 10, ---------------, 28 23 </trace>   : stroke #03
    <trace> 36 10, ---------------, 42 14 </trace>   : stroke #04
    <trace> 41 19, ---------------, 42 21 </trace>   : stroke #05
    <trace> 52 14, ---------------, 47 20 </trace>   : stroke #06
    <trace> 58  5, ---------------, 61  7 </trace>   : stroke #07
    <trace> 62 11, ---------------, 63 16 </trace>   : stroke #08
    <trace> 72  9, ---------------, 68 15 </trace>   : stroke #09
    <trace> 20 47, ---------------, 23 50 </trace>   : stroke #10
    <trace> 33 40, ---------------, 36 58 </trace>   : stroke #11
    <trace> 32 40, ---------------, 34 47 </trace>   : stroke #12
    <trace> 41 46, ---------------, 49 43 </trace>   : stroke #13
    <trace> 50 40, ---------------, 57 44 </trace>   : stroke #14
    <trace> 62 40, ---------------, 67 41 </trace>   : stroke #15
    <trace> 62 30, ---------------, 68 37 </trace>   : stroke #16
    <trace> 73 24, ---------------, 73 43 </trace>   : stroke #17
    <trace> 80 42, ---------------, 81 43 </trace>   : stroke #18
    <trace> 37 84, ---------------, 48 89 </trace>   : stroke #19
    <trace> 37 84, ---------------, 37 93 </trace>   : stroke #20
    <trace> 38 95, ---------------, 52 92 </trace>   : stroke #21
    <trace> 37 84, ---------------, 48 91 </trace>   : stroke #22
    <trace> 42 90, ---------------, 43 92 </trace>   : stroke #23
    <trace> 25 92, ---------------, 33 93 </trace>   : stroke #24
  </traceGroup>
</ink>
```

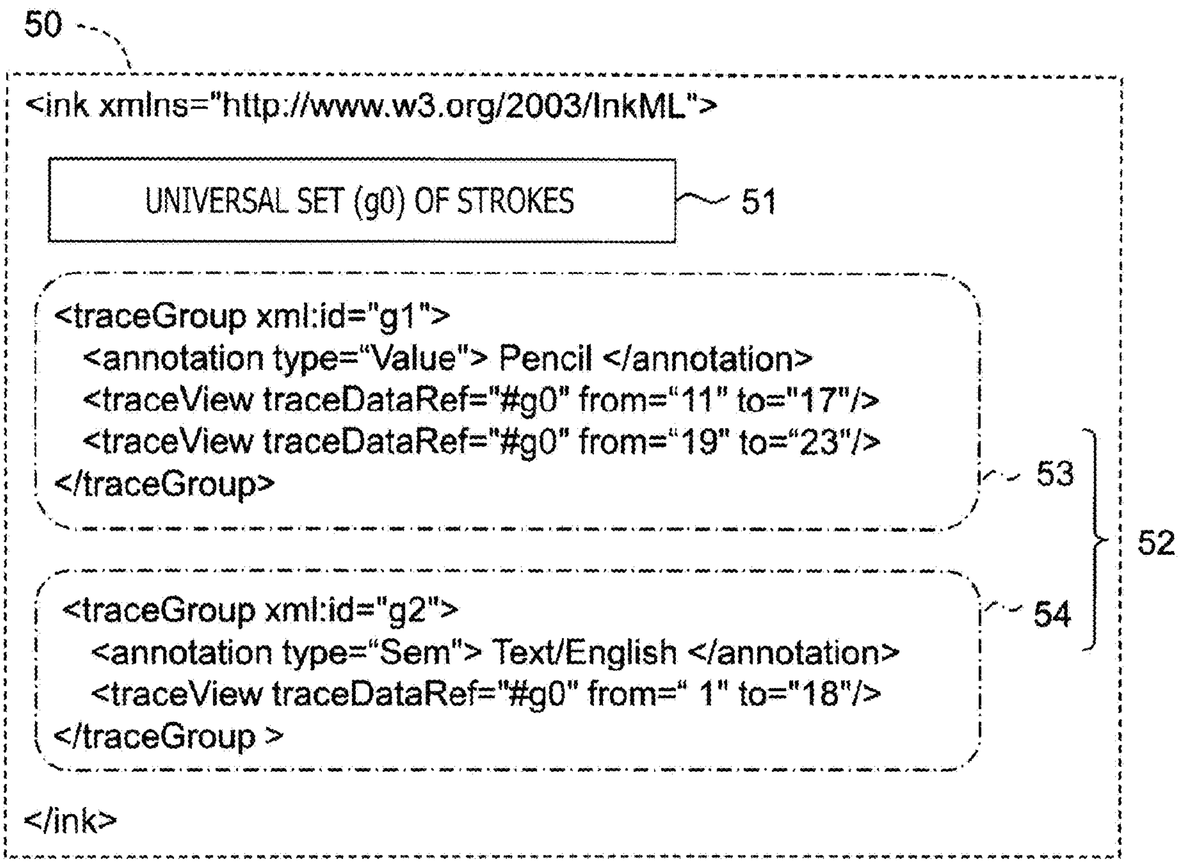

```
<ink xmlns="http://www.w3.org/2003/InkML">

    UNIVERSAL SET (g0) OF STROKES          ~ 51

    <traceGroup xml:id="g1">
        <annotation type="Value"> Pencil </annotation>
        <traceView traceDataRef="#g0" from="11" to="17"/>
        <traceView traceDataRef="#g0" from="19" to="23"/>
    </traceGroup>                                           ~ 53

    <traceGroup xml:id="g2">                                ~ 54
        <annotation type="Sem"> Text/English </annotation>
        <traceView traceDataRef="#g0" from=" 1" to="18"/>
    </traceGroup>

</ink>
```

52 braces 53 and 54

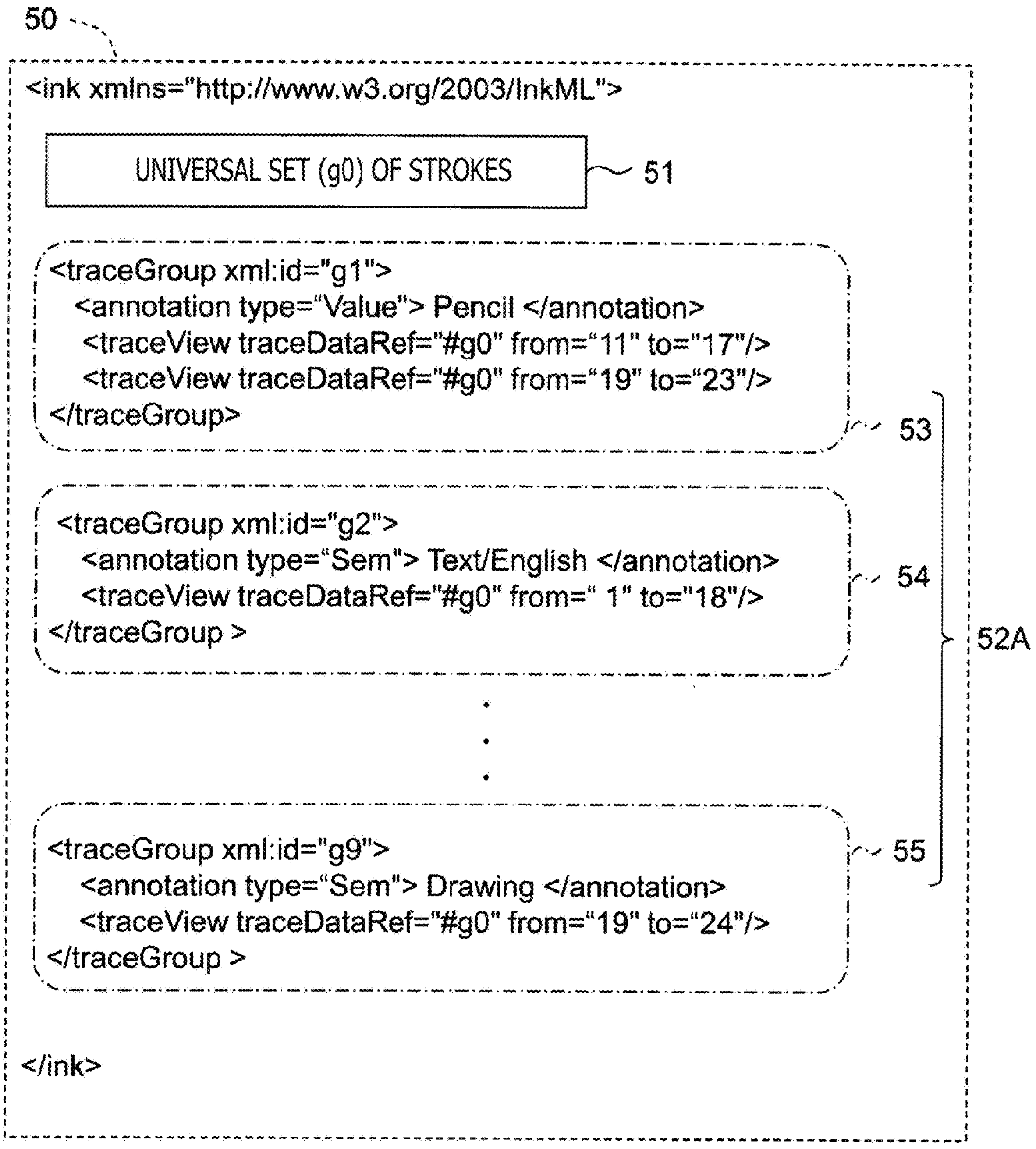

```
<ink xmlns="http://www.w3.org/2003/InkML">
```

UNIVERSAL SET (g0) OF STROKES ~ 51

```
<traceGroup xml:id="g1">
    <annotation type="Value"> Pencil </annotation>
    <traceView traceDataRef="#g0" from="11" to="17"/>
    <traceView traceDataRef="#g0" from="19" to="23"/>
</traceGroup>
```
~ 53

```
<traceGroup xml:id="g2">
    <annotation type="Sem"> Text/English </annotation>
    <traceView traceDataRef="#g0" from=" 1" to="18"/>
</traceGroup >
```
~ 54

⋮

```
<traceGroup xml:id="g9">
    <annotation type="Sem"> Drawing </annotation>
    <traceView traceDataRef="#g0" from="19" to="24"/>
</traceGroup >
```
~ 55

52A

```
</ink>
```

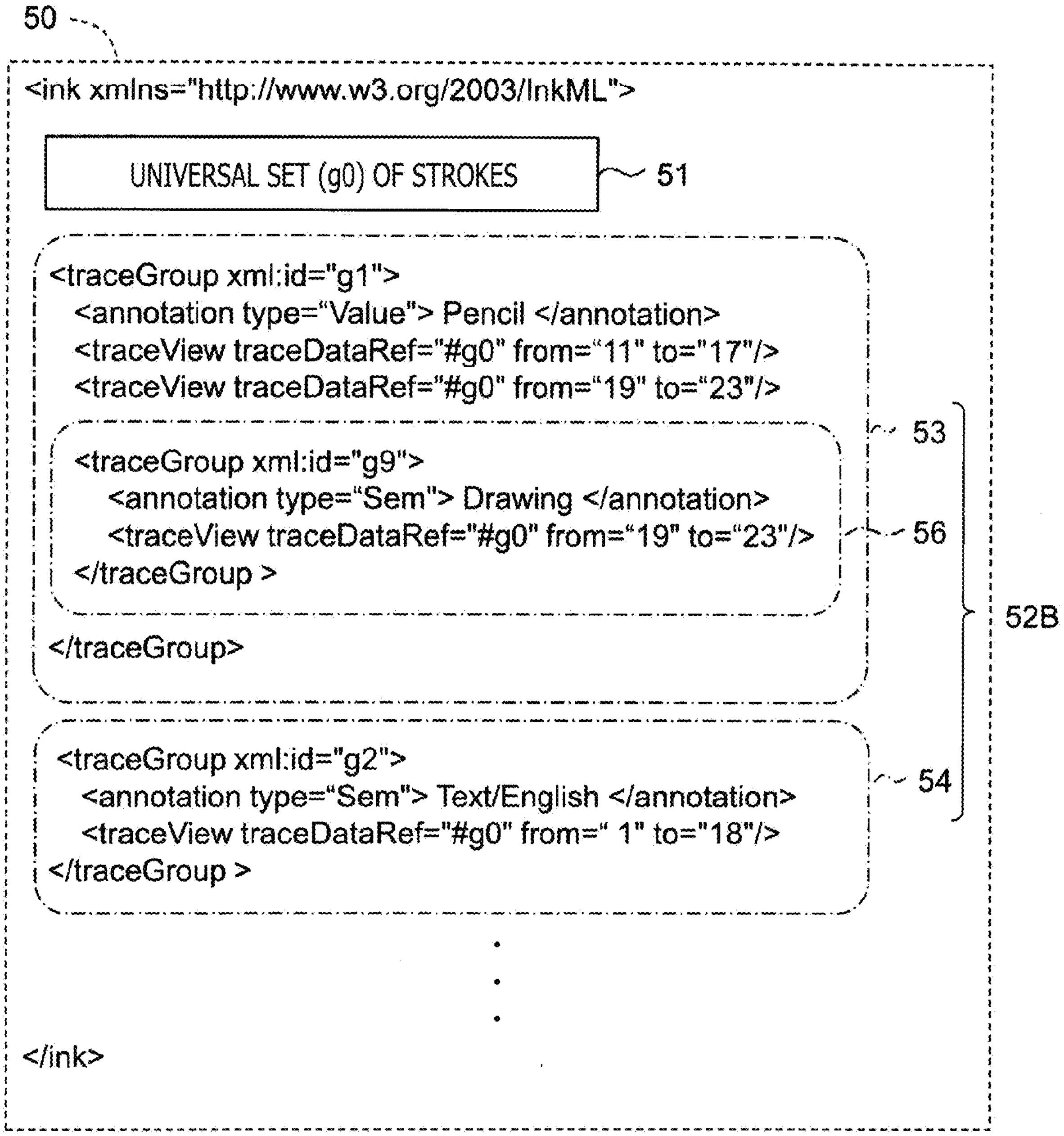

FIG. 15

```
<ink xmlns="http://www.w3.org/2003/InkML">

    UNIVERSAL SET (g0) OF STROKES         ~ 51

    <traceGroup xml:id="g1">
        <annotation type="Value"> Pencil </annotation>
        <traceView traceDataRef="#g0" from="11" to="17"/>
        <traceView traceDataRef="#g0" from="19" to="23"/>

        <traceGroup xml:id="g9">
            <annotation type="Sem"> Drawing </annotation>
            <traceView traceDataRef="#g0" from="19" to="23"/>
        </traceGroup >

    </traceGroup>

    <traceGroup xml:id="g2">
        <annotation type="Sem"> Text/English </annotation>
        <traceView traceDataRef="#g0" from=" 1" to="18"/>
    </traceGroup >

                    •
                    •
                    •

</ink>
```

50 → (whole block)
51 — UNIVERSAL SET (g0) OF STROKES
53 — traceGroup g1 block
56 — inner traceGroup g9
52B — outer bracket
54 — traceGroup g2 block

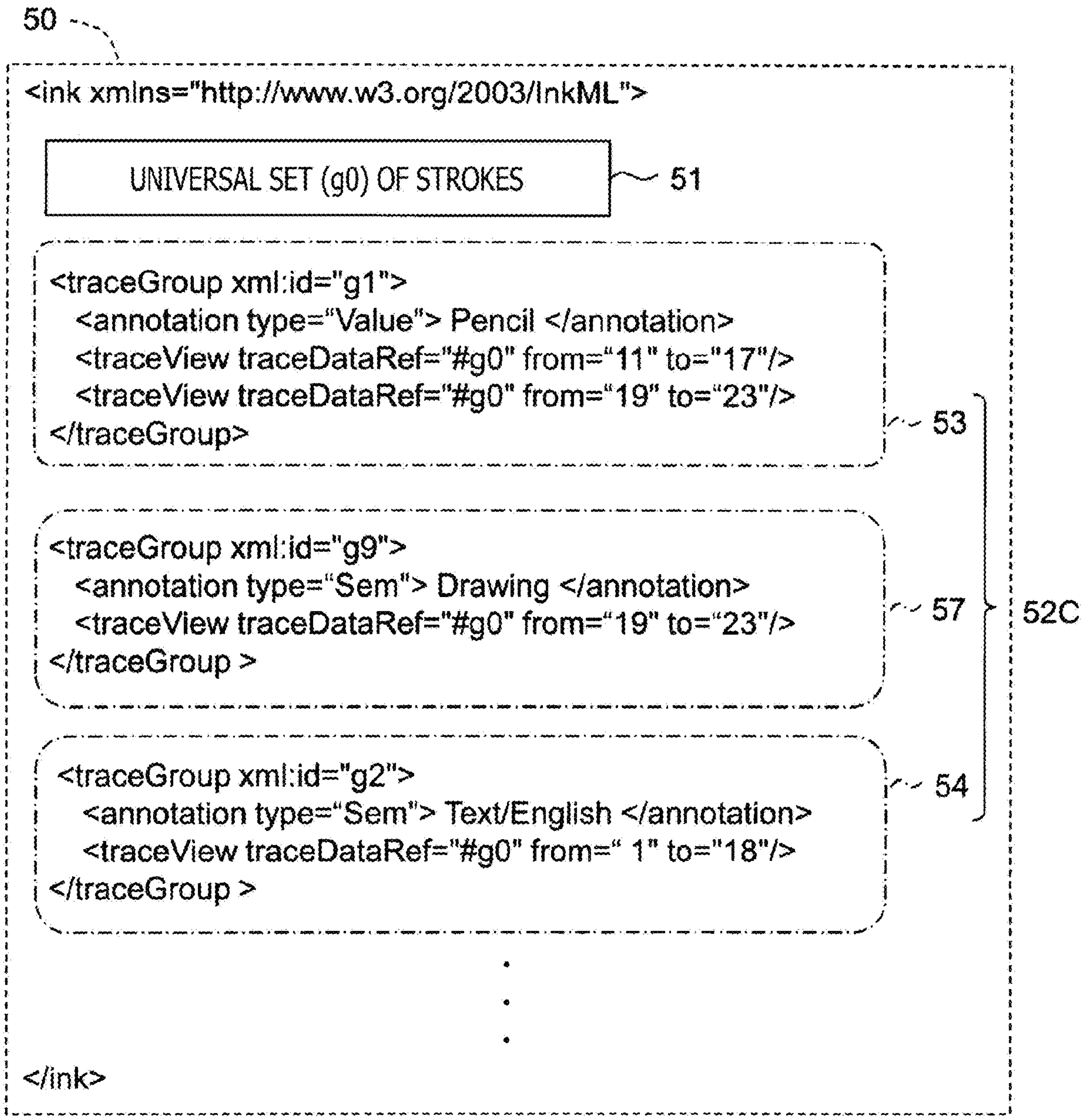

FIG.16

```
<ink xmlns="http://www.w3.org/2003/InkML">
```

UNIVERSAL SET (g0) OF STROKES ~ 51

```
<traceGroup xml:id="g1">
  <annotation type="Value"> Pencil </annotation>
  <traceView traceDataRef="#g0" from="11" to="17"/>
  <traceView traceDataRef="#g0" from="19" to="23"/>
</traceGroup>
```
~ 53

```
<traceGroup xml:id="g9">
  <annotation type="Sem"> Drawing </annotation>
  <traceView traceDataRef="#g0" from="19" to="23"/>
</traceGroup>
```
~ 57

```
<traceGroup xml:id="g2">
  <annotation type="Sem"> Text/English </annotation>
  <traceView traceDataRef="#g0" from=" 1" to="18"/>
</traceGroup>
```
~ 54

⋮

```
</ink>
```

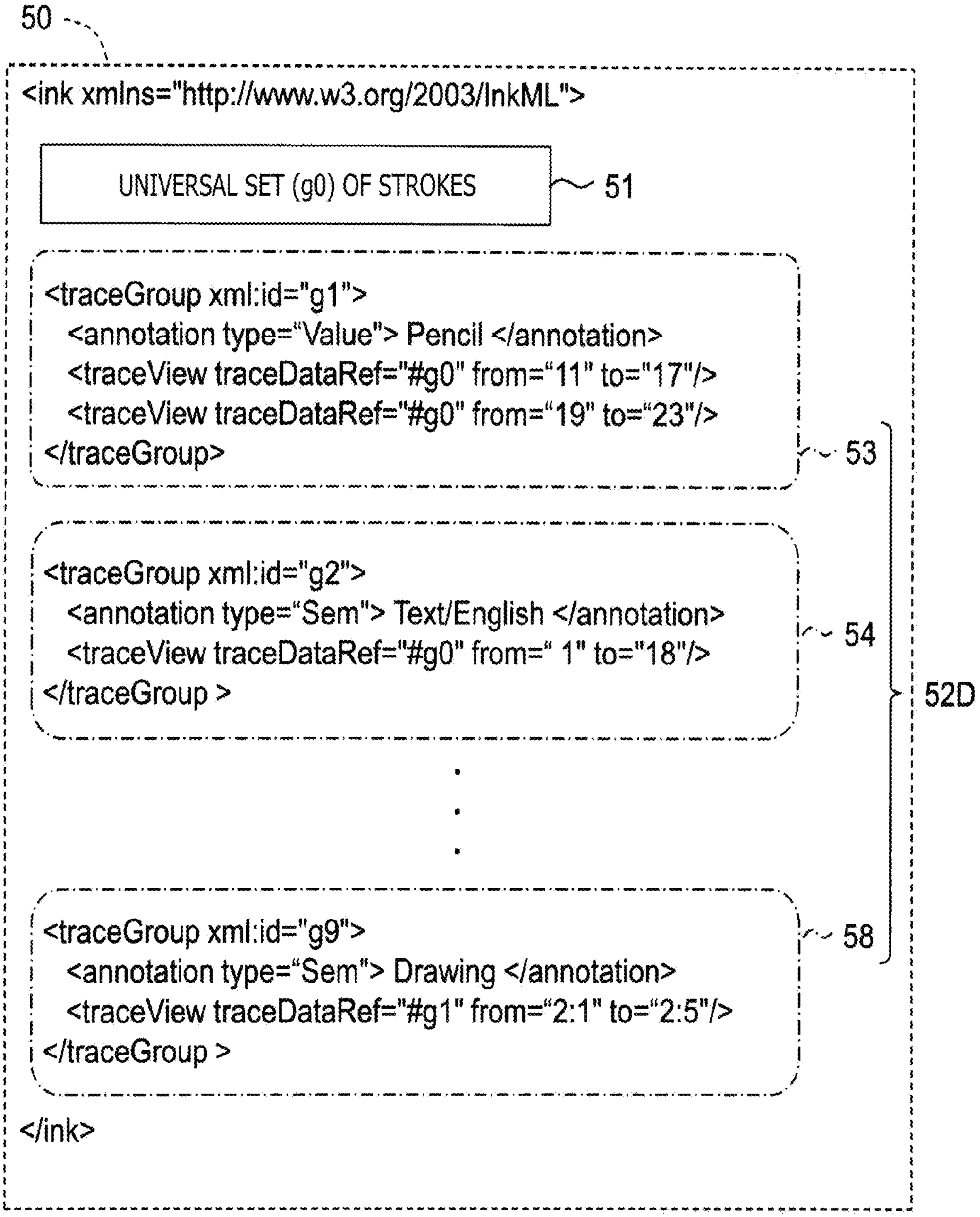

FIG.17

```
<ink xmlns="http://www.w3.org/2003/InkML">
```

UNIVERSAL SET (g0) OF STROKES ~ 51

```
<traceGroup xml:id="g1">
    <annotation type="Value"> Pencil </annotation>
    <traceView traceDataRef="#g0" from="11" to="17"/>
    <traceView traceDataRef="#g0" from="19" to="23"/>
</traceGroup>
```
~ 53

```
<traceGroup xml:id="g2">
    <annotation type="Sem"> Text/English </annotation>
    <traceView traceDataRef="#g0" from=" 1" to="18"/>
</traceGroup >
```
~ 54

⋮

```
<traceGroup xml:id="g9">
    <annotation type="Sem"> Drawing </annotation>
    <traceView traceDataRef="#g1" from="2:1" to="2:5"/>
</traceGroup >
```
~ 58

} 52D

```
</ink>
```

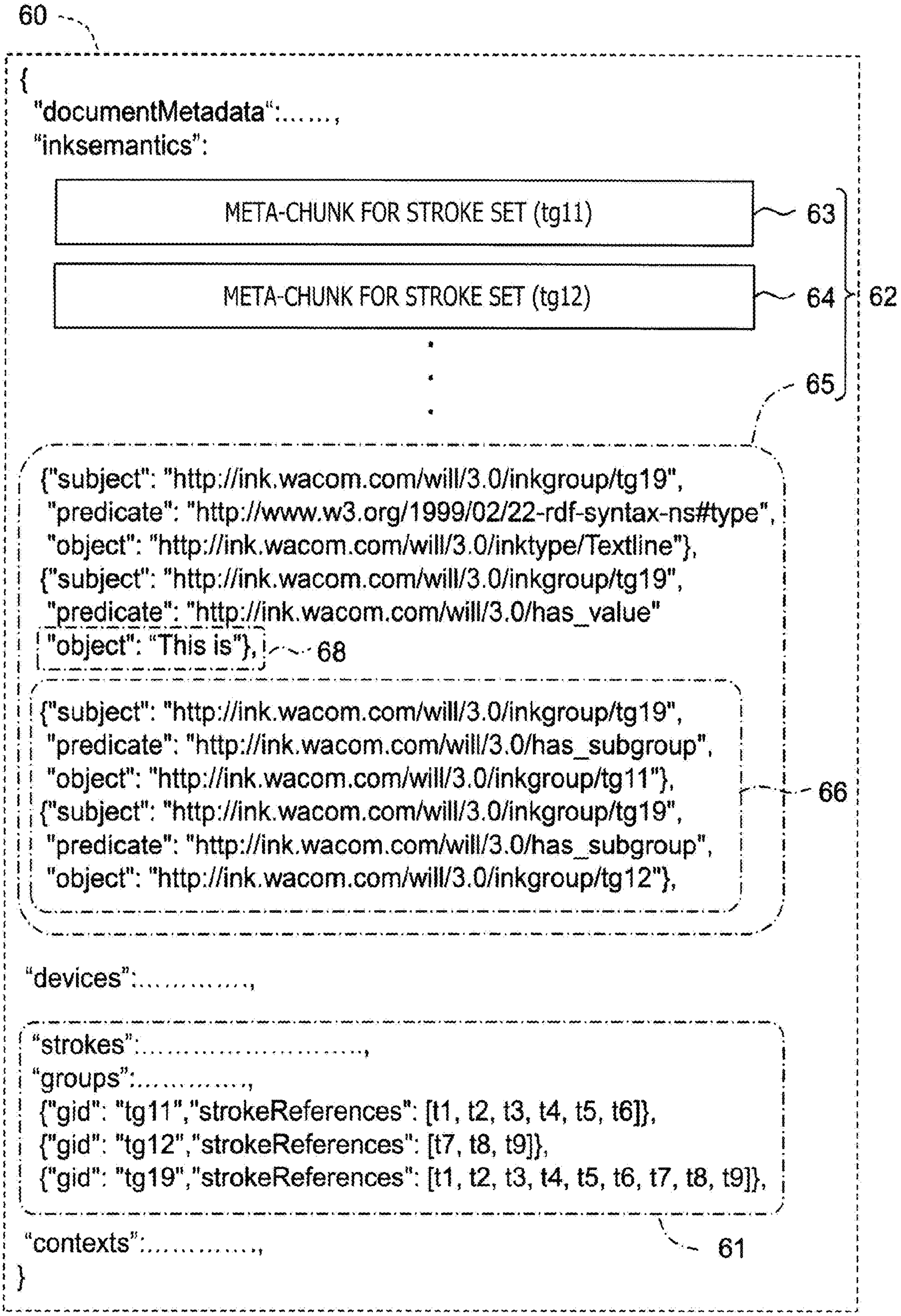

FIG.19

```
{
"documentMetadata":......,
"inksemantics":
```

| META-CHUNK FOR STROKE SET (tg11) | ~ 63 |
| --- | --- |

| META-CHUNK FOR STROKE SET (tg12) | ~ 64 |

}~ 62

~ 65

{"subject": "http://ink.wacom.com/will/3.0/inkgroup/tg19",
 "predicate": "http://www.w3.org/1999/02/22-rdf-syntax-ns#type",
 "object": "http://ink.wacom.com/will/3.0/inktype/Textline"},
{"subject": "http://ink.wacom.com/will/3.0/inkgroup/tg19",
 "predicate": "http://ink.wacom.com/will/3.0/has_value"
 "object": "This is"}, ~ 68

{"subject": "http://ink.wacom.com/will/3.0/inkgroup/tg19",
 "predicate": "http://ink.wacom.com/will/3.0/has_subgroup",
 "object": "http://ink.wacom.com/will/3.0/inkgroup/tg11"},
{"subject": "http://ink.wacom.com/will/3.0/inkgroup/tg19",
 "predicate": "http://ink.wacom.com/will/3.0/has_subgroup",
 "object": "http://ink.wacom.com/will/3.0/inkgroup/tg12"}, ~ 66

"devices":............,

"strokes":........................,
"groups":............,
 {"gid": "tg11","strokeReferences": [t1, t2, t3, t4, t5, t6]},
 {"gid": "tg12","strokeReferences": [t7, t8, t9]},
 {"gid": "tg19","strokeReferences": [t1, t2, t3, t4, t5, t6, t7, t8, t9]}, "contexts":............,
}

~ 61

INK DATA GENERATION APPARATUS, METHOD, AND PROGRAM

BACKGROUND

Technical Field

The present invention relates to an ink data generation apparatus, an ink data generation method, and an ink data generation program that generate ink data.

Description of the Related Art

Patent Document 1 discloses a method of generating a metadata block, in which N types of metadata identifying an input device are associated with M items of stroke data, and writing the metadata block into an ink file together with the stroke data.

PRIOR ART DOCUMENT

Patent Document

Patent Document 1: WO 2016/157400

BRIEF SUMMARY

Technical Problem

An object of the present invention is to provide an ink data generation apparatus, an ink data generation method, and an ink data generation program that are capable of improving ease of handling ink data when or after metadata is generated.

Technical Solution

An ink data generation apparatus according to a first aspect of the present invention is an apparatus that generates ink data including metadata describing meta-information regarding each of sets of strokes, the ink data generation apparatus including: a first acquisition section configured to acquire first set data representing stroke elements belonging to a first set to which the meta-information has not been assigned yet; a second acquisition section configured to acquire second set data representing stroke elements belonging to a second set to which the meta-information has already been assigned on a per stroke set basis; a set determination section configured to perform a determination determine, by comparing the stroke elements of the first set data and the stroke elements of the second set data using the first set data acquired by the first acquisition section and the second set data acquired by the second acquisition section, as to an inclusion relation between the first set and the second set; and a data generation section configured to generate first metadata for the first set described in a form that varies in accordance with a result of the determination performed by the set determination section.

An ink data generation apparatus according to a second aspect of the present invention is an apparatus that generates ink data including metadata describing meta-information regarding each of sets of strokes, the ink data generation apparatus including: a data acquisition section configured to acquire set data representing stroke elements belonging to a set of strokes on a set-by-set basis; and a data output section configured to output metadata indicating an inclusion relation between a plurality of sets on the basis of the set data acquired by the data acquisition section on a set-by-set basis.

An ink data generation method according to a third aspect of the present invention is a method for generating ink data including metadata describing meta-information regarding each of sets of strokes, the ink data generation method being implemented by one or a plurality of computers performing: a first acquisition step of acquiring first set data representing stroke elements belonging to a first set to which the meta-information has not been assigned yet; a second acquisition step of acquiring second set data representing stroke elements belonging to a second set to which the meta-information has already been assigned on a per stroke set basis; a determination step of performing a determination, by comparing the stroke elements of the first set data and the stroke elements of the second set data using the acquired first set data and the acquired second set data, as to an inclusion relation between the first set and the second set; and a generation step of generating first metadata for the first set described in a form that varies in accordance with a result of the determination at the determination step.

An ink data generation program according to a fourth aspect of the present invention is a program for generating ink data including metadata describing meta-information regarding each of sets of strokes, the ink data generation program causing one or a plurality of computers to perform: a first acquisition step of acquiring first set data representing stroke elements belonging to a first set to which the meta-information has not been assigned yet; a second acquisition step of acquiring second set data representing stroke elements belonging to a second set to which the meta-information has already been assigned on a per stroke set basis; a determination step of performing a determination, by comparing the stroke elements of the first set data and the stroke elements of the second set data using the acquired first set data and the acquired second set data, as to an inclusion relation between the first set and the second set; and a generation step of generating first metadata for the first set described in a form that varies in accordance with a result of the determination at the determination step.

Advantageous Effect

The present invention is capable of improving ease of handling ink data when or after metadata is generated.

BRIEF DESCRIPTION OF THE SEVERAL VIEWS OF THE DRAWINGS

FIG. 2 is a diagram illustrating an example of the ink data in FIG. 1.

FIG. 10 is a diagram illustrating an example description of the ink data corresponding to FIG. 9.

FIG. 13 is a diagram illustrating an example description of the ink data corresponding to FIG. 12.

FIG. 15 is a diagram illustrating a first example description of the ink data corresponding to FIG. 14.

FIG. 16 is a diagram illustrating a second example description of the ink data corresponding to FIG. 14.

FIG. 17 is a diagram illustrating a third example description of the ink data corresponding to FIG. 14.

FIG. 19 is a diagram illustrating an example description of the ink data corresponding to FIG. 18.

DETAILED DESCRIPTION

Structure of Ink Data Generation Apparatus 10

Overall Structure

Figure 1:
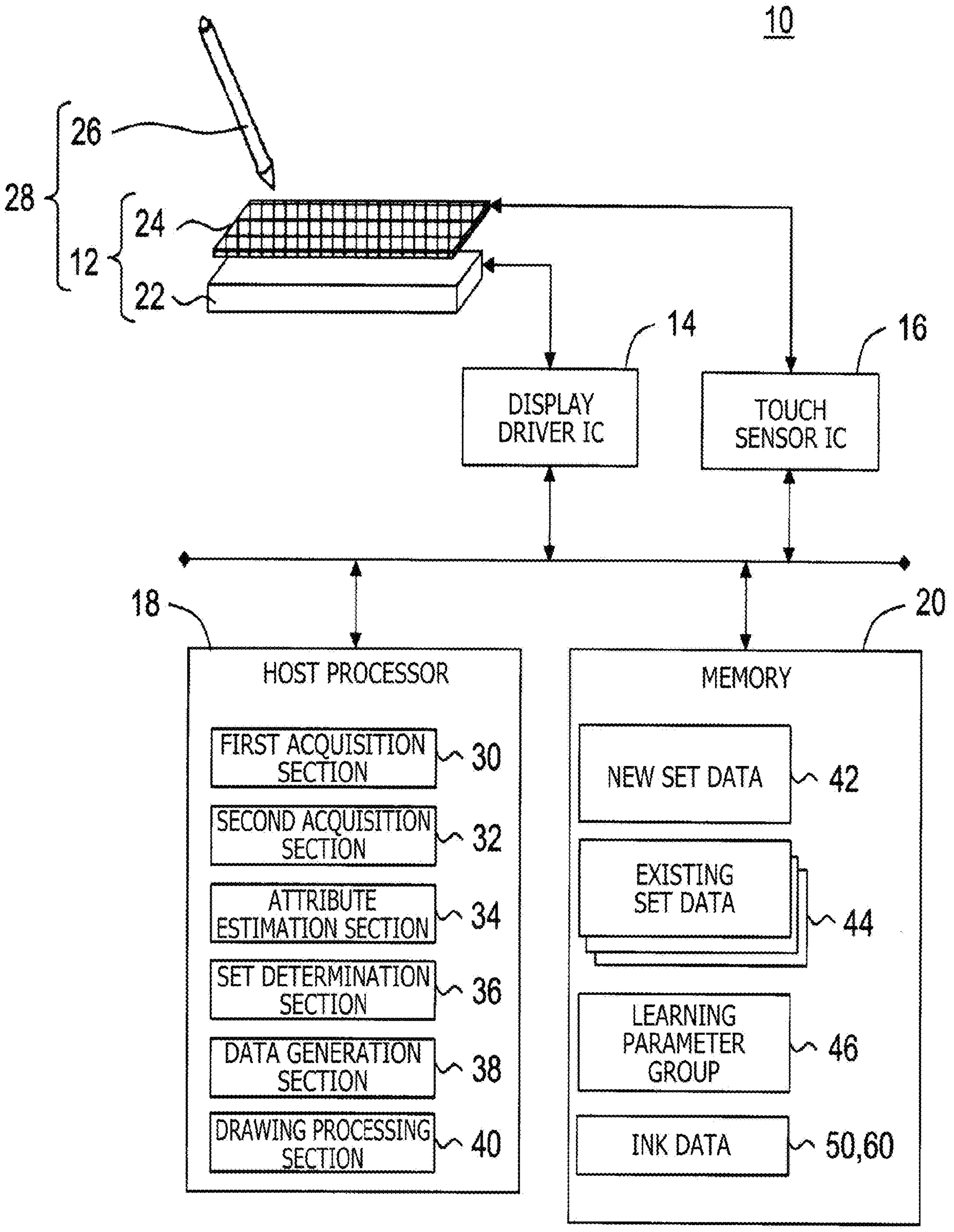
FIG. 1 is an overall configuration diagram of an ink data generation apparatus according to an embodiment of the present invention.

FIG. 1 is an overall configuration diagram of an ink data generation apparatus 10 according to an embodiment of the present invention. The ink data generation apparatus 10 is an electronic device provided with a touchscreen display 12, and is formed by, for example, a tablet terminal, a smart phone, or a personal computer. The ink data generation apparatus 10 specifically includes the touchscreen display 12, a display driver IC (Integrated Circuit) 14, a touch sensor IC 16, a host processor 18, and a memory 20.

The touchscreen display 12 includes a display panel 22 capable of displaying visible content, and a touch sensor 24 arranged on the display panel 22. The display panel 22 is capable of displaying a black-and-white image or a color image, and may be, for example, a liquid crystal panel or an organic EL (Electro-Luminescence) panel. The touch sensor 24 is provided with a plurality of X-line electrodes for sensing positions along an X-axis of a sensor coordinate system, and a plurality of Y-line electrodes for sensing positions along a Y-axis thereof.

The display driver IC 14 is an integrated circuit for performing drive control on the display panel 22. The display driver IC 14 drives the display panel 22 on the basis of a display signal supplied from the host processor 18. Content represented by ink data 50 is thus displayed on the display panel 22.

The touch sensor IC 16 is an integrated circuit for performing drive control on the touch sensor 24. The touch sensor IC 16 drives the touch sensor 24 on the basis of a control signal supplied from the host processor 18. The touch sensor IC 16 thus implements "pen detection functions" that detect the state of a stylus 26, and "touch detection functions" that detect a touch made by a finger of a user or the like.

Examples of the pen detection functions include a function of scanning the touch sensor 24, a function of receiving and analyzing a downlink signal, a function of estimating the state (e.g., position, posture, pen pressure, etc.) of the stylus 26, and a function of generating and transmitting an uplink signal including a command for the stylus 26. Meanwhile, examples of the touch detection functions include a function of two-dimensionally scanning the touch sensor 24, a function of acquiring a detection map on the touch sensor 24, and a function of classifying regions (e.g., classifying a finger, a palm, etc.) on a detection map.

Thus, a user interface (hereinafter referred to as a UI section 28) is formed by combining input functions implemented by the touch sensor 24 and the stylus 26 and an output function implemented by the display panel 22.

The host processor 18 is formed by a processing/computing device, examples of which include a CPU (Central Processing Unit), an MPU (Micro-Processing Unit), and a GPU (Graphics Processing Unit). The host processor 18 reads a program stored in the memory 20 and executes the program, and thereby functions as a first acquisition section 30, a second acquisition section 32, an attribute estimation section 34, a set determination section 36, a data generation section 38 (a data output section), and a drawing processing section 40.

The memory 20 is formed by a non-temporary computer-readable storage medium. Here, examples of such a computer-readable storage medium include storage devices including a hard disk drive (HDD) and a solid-state drive (SSD), and portable media including a magneto-optical disk, a ROM (Read-Only Memory), a CD-ROM (Compact Disc-Read-Only Memory), and a flash memory. In the example of the present drawing, new set data 42 (i.e., first set data), existing set data 44 (i.e., second set data), a learning parameter group 46, and the ink data 50 are stored in the memory 20.

Example of Ink Data 50

FIG. 2 is a diagram illustrating an example of the ink data 50 in FIG. 1. The following description will be made taking an example of InkML (Ink Markup Language) which describes a digital ink in an XML (extensible Markup Language) format. Note that the data format, i.e., what is called "ink markup language," of the ink data 50 is not limited to InkML, and that WILL (Wacom Ink Layer Language) or ISF (Ink Serialized Format), for example, may alternatively be used. Further, describing the ink data 50 using a data structure format of JSON (JavaScript (registered trademark) Object Notation) facilitates exchange of the data between various types of software and programming languages.

In the example of the present drawing, the ink data 50 includes stroke data 51 that describes at least one stroke (in the example of the present drawing, 24 strokes). As will be understood from the present drawing, each stroke is described by a plurality of items of point data sequentially arranged in <trace> tags. The items of point data are each made up of at least an indicated position (X-coordinate and Y-coordinate), and are separated by a delimiter, such as a comma. For the sake of convenience in illustration, only items of point data that represent a starting point and an ending point of each stroke are depicted, while items of point data that represent a plurality of intermediate points are omitted. Note that the items of point data may include, in addition to the aforementioned indicated positions, an order of writing, a pen pressure and/or a posture of the stylus 26, and/or the like.

Figure 3:
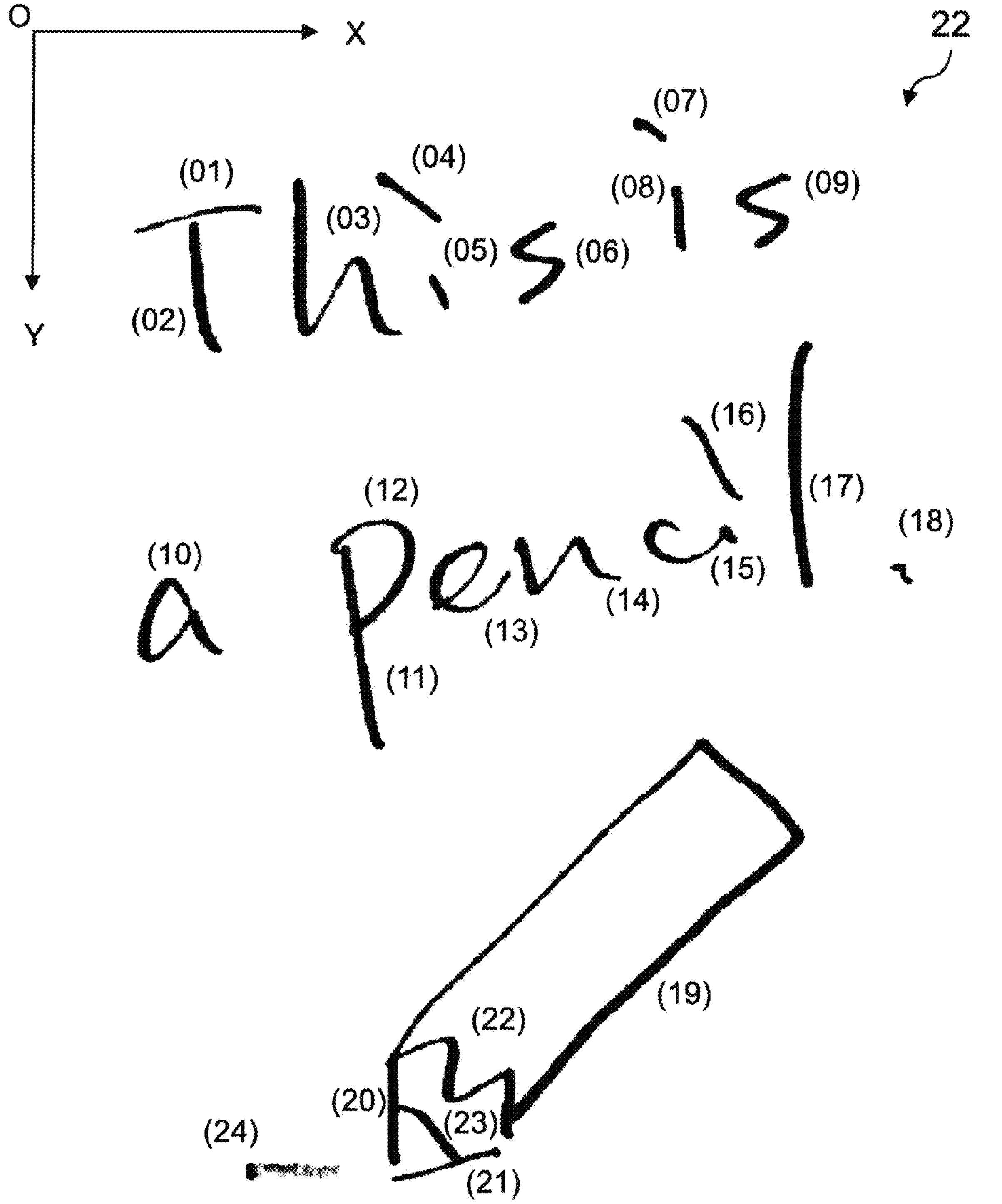
FIG. 3 is a diagram illustrating content visualized on the basis of the ink data in FIG. 2.

FIG. 3 is a diagram illustrating content visualized on the basis of the ink data 50 in FIG. 2. On the display panel 22 (FIG. 1), a two-dimensional coordinate system (hereinafter referred to as a sensor coordinate system: X-Y) for identifying positions detected on the touch sensor 24 is defined. This content includes a character string "This is a pencil." and a drawing of a pencil. It should be noted that numbers in parentheses indicate the writing order of strokes (stroke IDs (IDentifications)=01-24), and do not constitute a part of the content.

First Operation of Ink Data Generation Apparatus 10

The ink data generation apparatus 10 according to this embodiment has the structure described above. First, a first operation of the ink data generation apparatus 10 will be described below with reference to a flowchart of FIG. 4 and FIGS. 5 to 10. This "first operation" means an operation of assisting a user in assigning meta-information (e.g., a data attribute, a creator or an author, a date and time of creation, a used device, etc.).

Prior to the first operation, the drawing processing section 40 analyzes the ink data 50 read from the memory 20, performs a desired rasterization process on the stroke data 51, and generates a display signal representing the content. The display driver IC 14 drives the display panel 22 on the basis of the display signal supplied from the host processor 18. The visualized content is thus displayed on the display panel 22.

Description of First Operation

Figure 4:
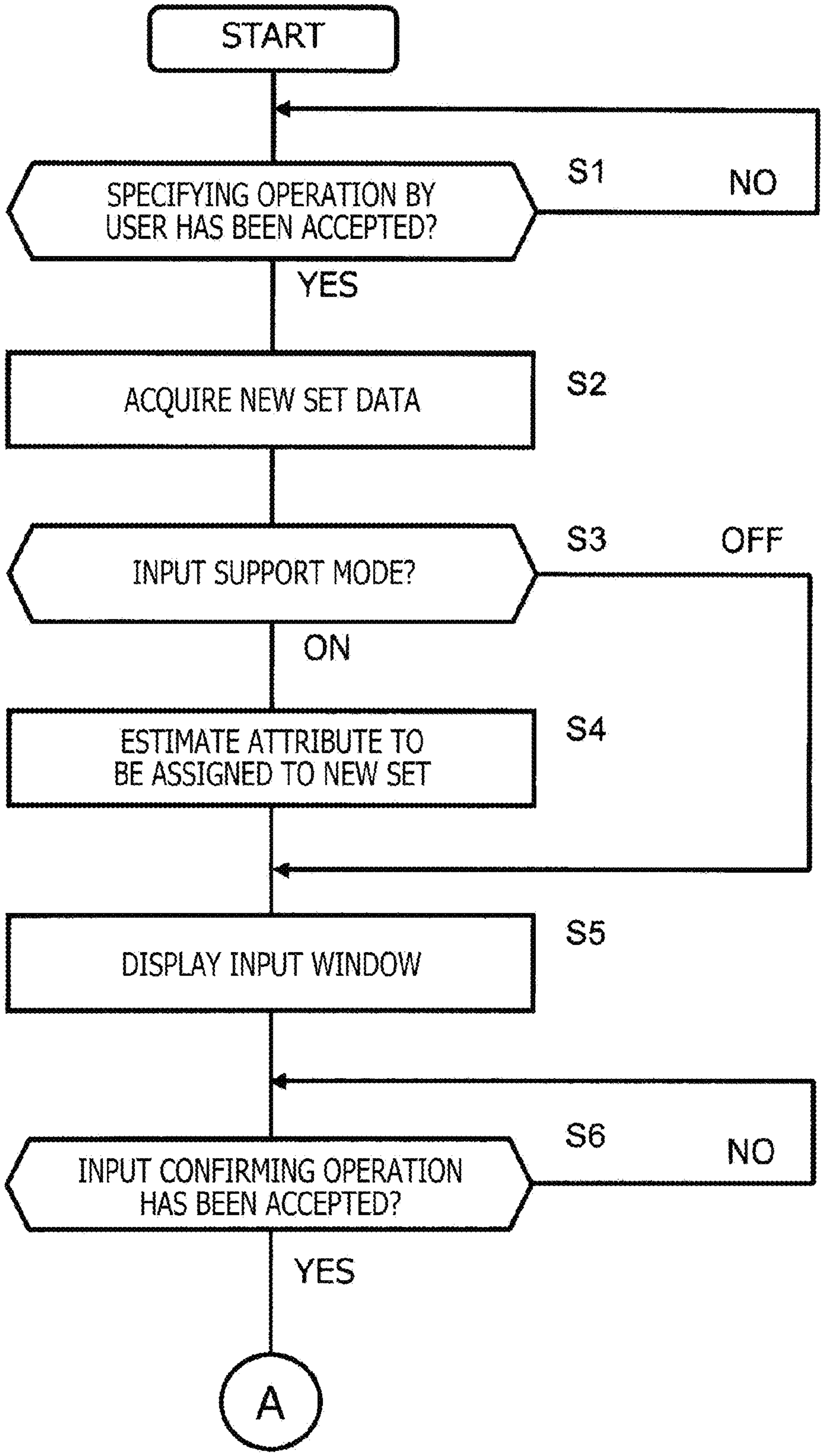
FIG. 4 is a first flowchart for describing an operation of the ink data generation apparatus illustrated in FIG. 1.

At step S1 in FIG. 4, the host processor 18 determines whether or not an operation of specifying a new set (i.e., a first set) of strokes to which meta-information is to be assigned has been accepted. This "specifying operation" is an operation for selecting one or more strokes from among a plurality of strokes, and examples thereof include a "lasso operation" of enclosing a selection target with a lasso.

Figure 5:
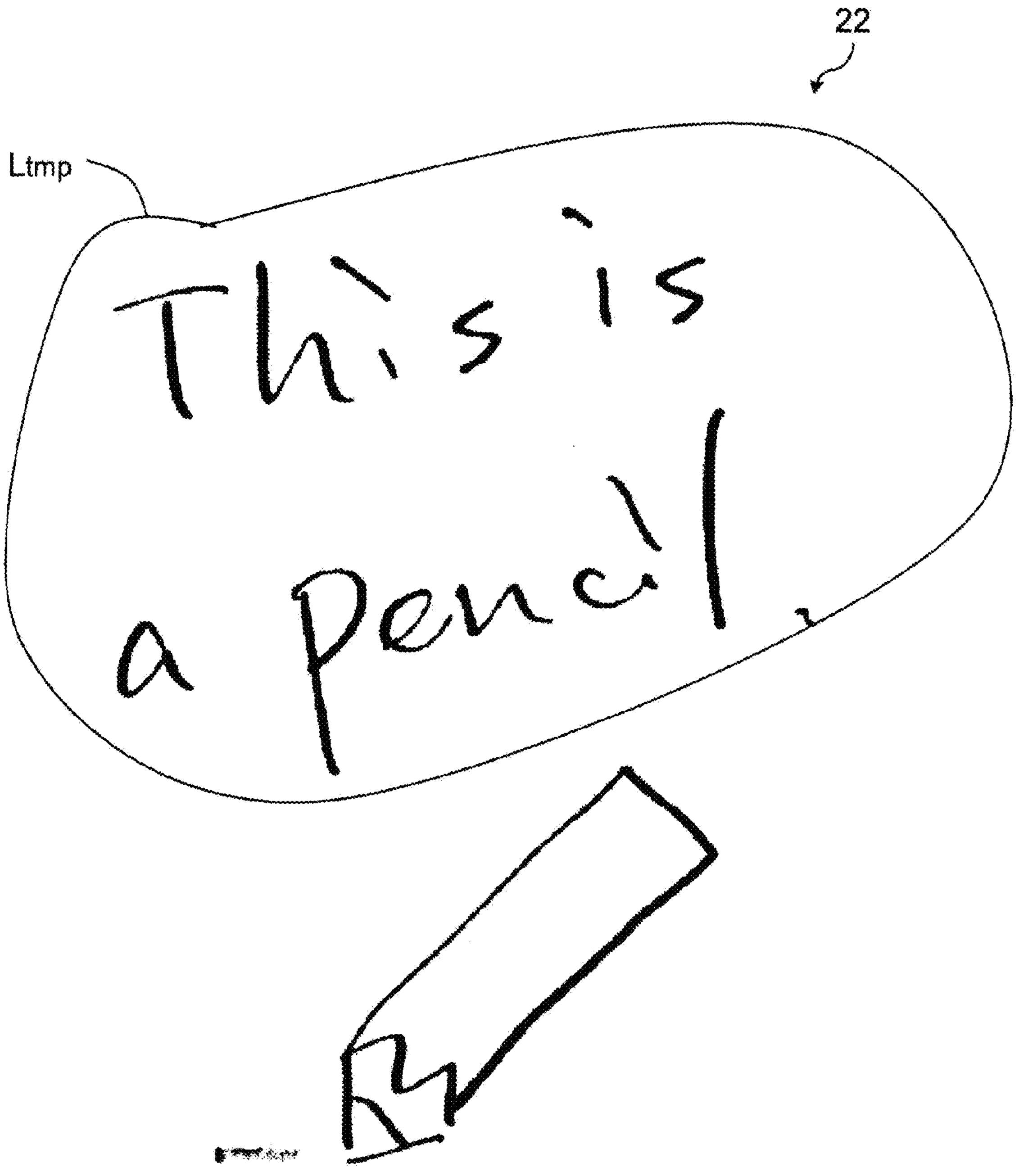
FIG. 5 is a diagram illustrating a method of specifying a new set with a lasso operation.

FIG. 5 is a diagram illustrating a method of specifying a new set with the lasso operation. The user performs a writing operation of enclosing the whole of strokes to which meta-information is to be assigned while moving the stylus 26 on a touch surface on the display panel 22. This handwriting input causes a lasso Ltmp to be displayed on the visualized content in an overlapping manner.

If a specifying operation by the user has not been accepted yet (step S1: NO), control stays at step S1 until this specifying operation is accepted. Meanwhile, if a specifying operation by the user has been accepted (step S1: YES), control proceeds to the next step S2.

At step S2, the first acquisition section 30 acquires data (hereinafter referred to as the new set data 42) representing stroke elements that belong to the new set on the basis of the content of the specifying operation accepted at step S1. The new set data 42 is data capable of identifying the stroke elements, and may be, for example, stroke IDs, which are identification information for the strokes. In the example of FIGS. 2 and 5, the first acquisition section 30 acquires stroke IDs=01-18 as the new set data 42.

At step S3, the host processor 18 determines whether a mode (hereinafter referred to simply as an "input support mode") for providing assistance in inputting the meta-information is ON or OFF. If this input support mode is "OFF" (step S3: OFF), control proceeds to step S5, omitting a performance of step S4. Meanwhile, if the input support mode is "ON" (step S3: ON), control proceeds to the next step S4.

At step S4, the attribute estimation section 34 estimates the attribute to be assigned to the new set on the basis of mutual relations between the positions or shapes of the plurality of strokes that form the new set specified at step S1. Here, the attribute estimation section 34 estimates a semantics attribute of the new set using a discriminator 70 (see FIG. 7A) constructed by machine learning. A method of estimating the attribute will now be described in detail below with reference to FIGS. 6A to 7B.

Figure 6A:
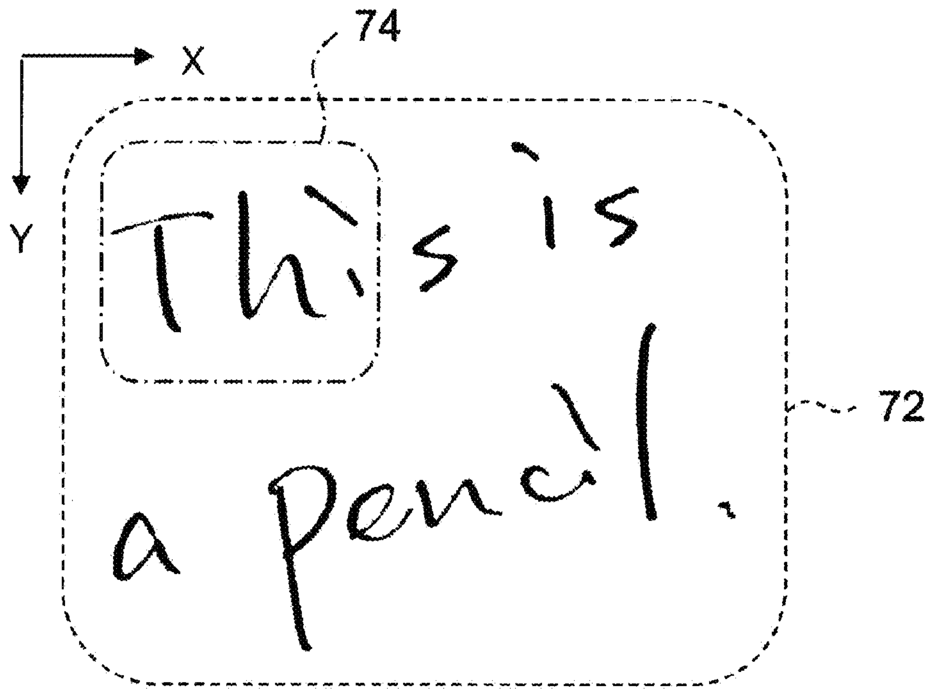
FIG. 6A is a diagram illustrating a method of selecting a subgroup.
Figure 6B:
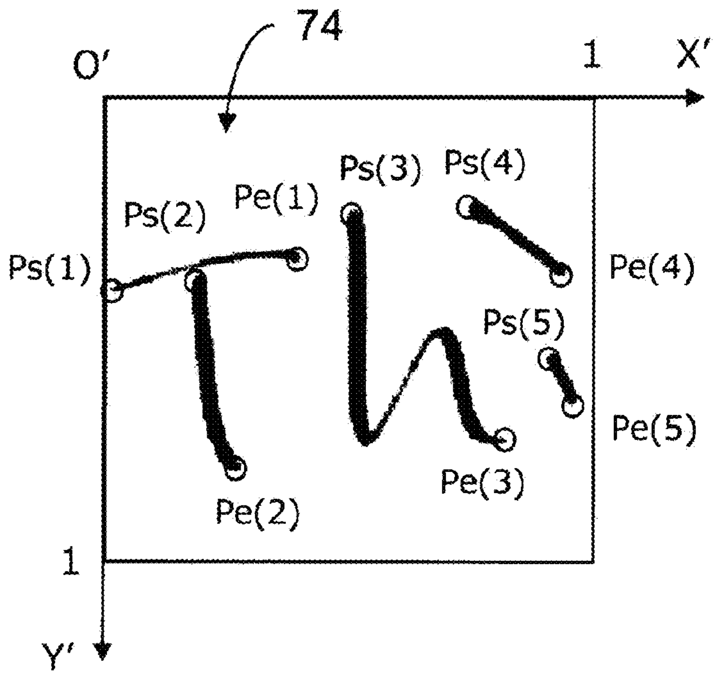
FIG. 6B is a diagram illustrating a method of extracting feature amounts in the subgroup.

FIGS. 6A and 6B are diagrams illustrating an example method of generating input data for the discriminator 70. In more detail, FIG. 6A is a diagram illustrating a method of selecting a subgroup 74, and FIG. 6B is a diagram illustrating a method of extracting feature amounts in the subgroup 74.

As illustrated in FIG. 6A, the attribute estimation section 34 selects one subgroup 74 made up of a predetermined number of strokes from among a group 72 composed of 18 stroke elements (stroke IDs=01-18). It is assumed here that five strokes having five consecutive IDs=01-05 starting with ID=01 have been extracted.

As illustrated in FIG. 6B, the attribute estimation section 34 sets a square region encompassing all the five strokes that belong to the subgroup 74, and defines a two-dimensional coordinate system (hereinafter referred to as a normalized coordinate system; X'-Y') that matches this region. An origin O' of this normalized coordinate system corresponds to a vertex of the square region that is located closest to an origin O of the sensor coordinate system. An X'-axis of the normalized coordinate system is parallel to the X-axis of the sensor coordinate system, while a Y'-axis of the normalized coordinate system is parallel to the Y-axis of the sensor coordinate system. In addition, the scales of the X'-axis and the Y'-axis are normalized so that coordinates of four vertices defining the square region will be (0, 0), (1, 0), (0, 1), and (1, 1).

Referring to the stroke data 51 (FIG. 2), the attribute estimation section 34 acquires coordinate values (X, Y) of a starting point Ps of each stroke and coordinate values (X, Y) of an ending point Pe of the stroke in the sensor coordinate system. Then, the attribute estimation section 34 derives coordinate values (X', Y') of the starting point Ps of the stroke and coordinate values (X', Y') of the ending point Pe of the stroke in the normalized coordinate system by performing linear transformation of the coordinate system.

Figure 7A:
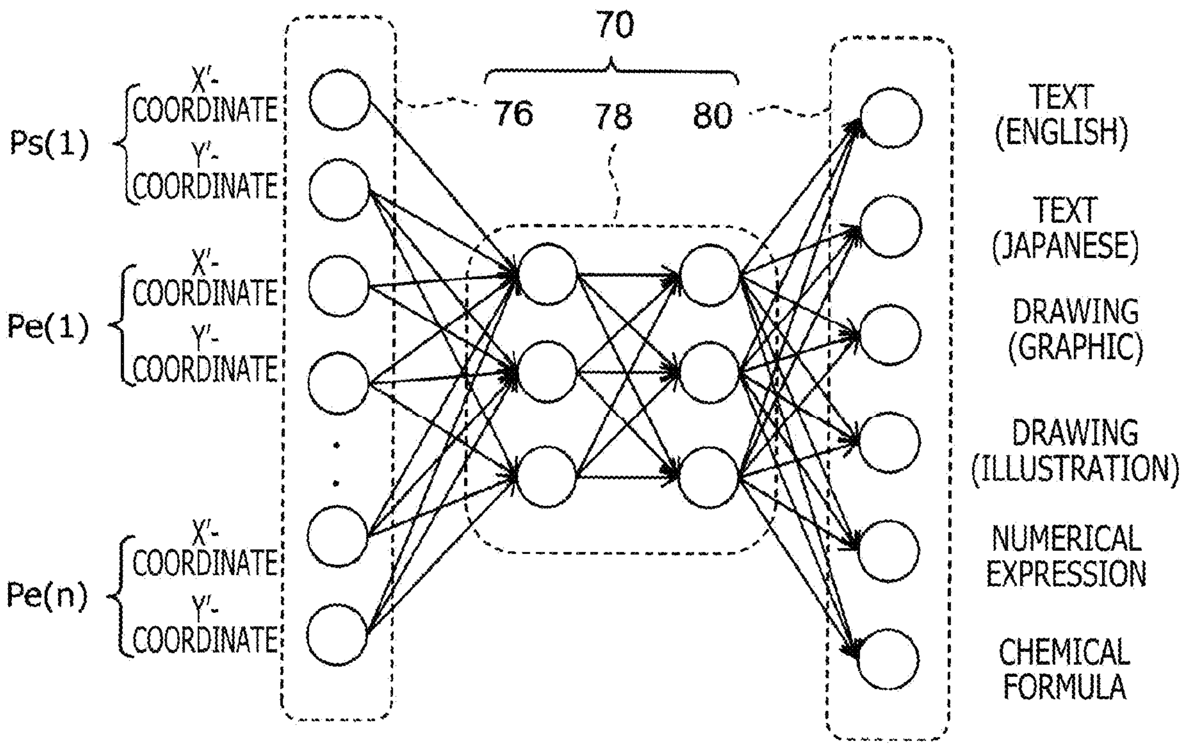
FIG. 7A is a diagram illustrating an example configuration of a discriminator.
Figure 7B:
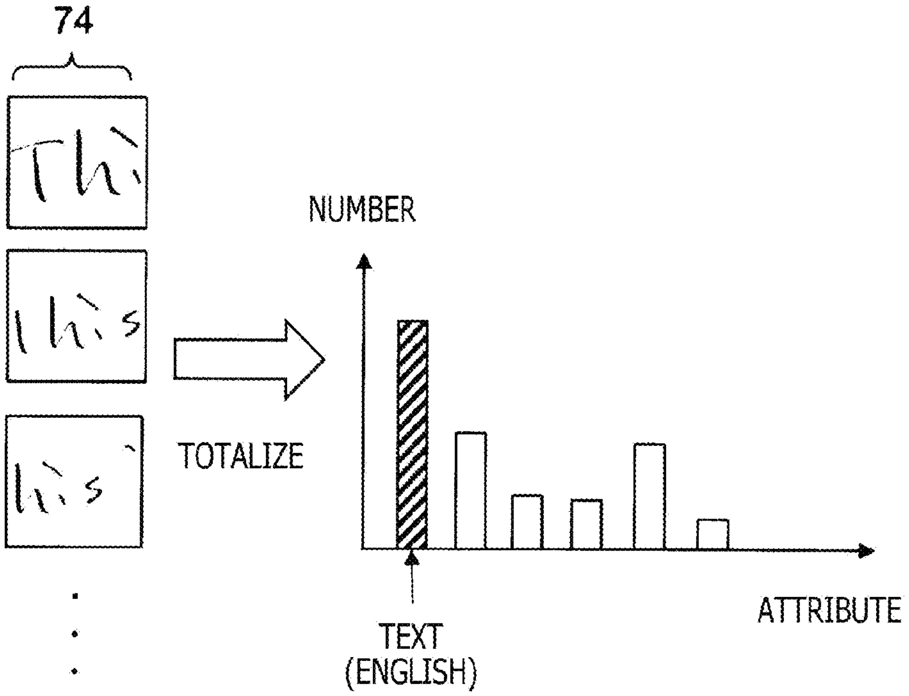
FIG. 7B is a diagram illustrating a method of deriving a histogram.

FIGS. 7A and 7B are diagrams illustrating an example method of estimating the semantics attribute. In more detail, FIG. 7A is a diagram illustrating an example configuration of the discriminator 70, and FIG. 7B is a diagram illustrating a method of deriving a histogram.

As illustrated in FIG. 7A, the discriminator 70 is formed by a hierarchical neural network made up of an input layer 76, intermediate layers 78, and an output layer 80, for example. An algorithm of the discriminator 70 is determined by values of the learning parameter group 46, which is a collection of learning parameters. The learning parameter group 46 may include, for example, a coefficient describing an activation function of a unit corresponding to a neuron, a weighting coefficient corresponding to strength of synaptic junction, the number of units constituting each layer, and the number of intermediate layers 78. The learning parameter group 46 is stored in the memory 20 (FIG. 1) with the values thereof determined by completion of learning, and is read at appropriate times as necessary.

The input layer 76 is a layer at which feature amounts concerning the starting and ending points of the strokes are inputted and is made up of 20 units in the example of the present drawing. These feature amounts form an input vector composed of 20 components, i.e., [1] the X'-coordinates of the starting points Ps, [2] the Y'-coordinates of the starting points Ps, [3] the X'-coordinates of the ending points Pe, and [4] the Y'-coordinates of the ending points Pe, arranged according to the order of the stroke ID.

The output layer 80 is a layer at which a collection of label values (hereinafter referred to as a label group) representing semantics attributes is outputted, and is made up of six units in the example of the present drawing. This label group forms an output vector composed of six components indicating the likelihoods of [1] Text (English), [2] Text (Japanese), [3] Drawing (Graphic), [4] Drawing (Illustration), [5] Numerical Equation, and [6] Chemical Formula.

The discriminator 70 accepts input of the feature amounts generated from the subgroup 74 via the input layer 76, passes the feature amounts through the intermediate layers 78, and outputs a label group corresponding to the subgroup 74 to the output layer 80. In the case where each label is defined in the range [0, 1], for example, the semantics attribute that has the greatest label value, e.g., "Text (English)," is selected.

As illustrated in FIG. 7B, after identifying the semantics attribute of the first subgroup 74, the attribute estimation section 34 selects a next subgroup 74 made up of five strokes (IDs=02-06), with the stroke IDs incremented by one, and performs the above-described discrimination process thereon. Then, the attribute estimation section 34 totals results of discrimination using a plurality of subgroups 74, and creates a histogram in which the "frequency" is the number of semantics attributes. In the example of the present drawing, it is estimated that "Text (English)," which has the greatest frequency in the histogram, is the semantics attribute to be assigned to the new set (i.e., the group 72 in FIG. 6A).

At step S5 in FIG. 4, the host processor 18 causes an input window 82 for input of the meta-information (e.g., an annotation) to be displayed on the display panel 22. The input window 82 is displayed, for example, at a position that does not overlap with a closed region enclosed by the lasso Ltmp.

Figure 8:
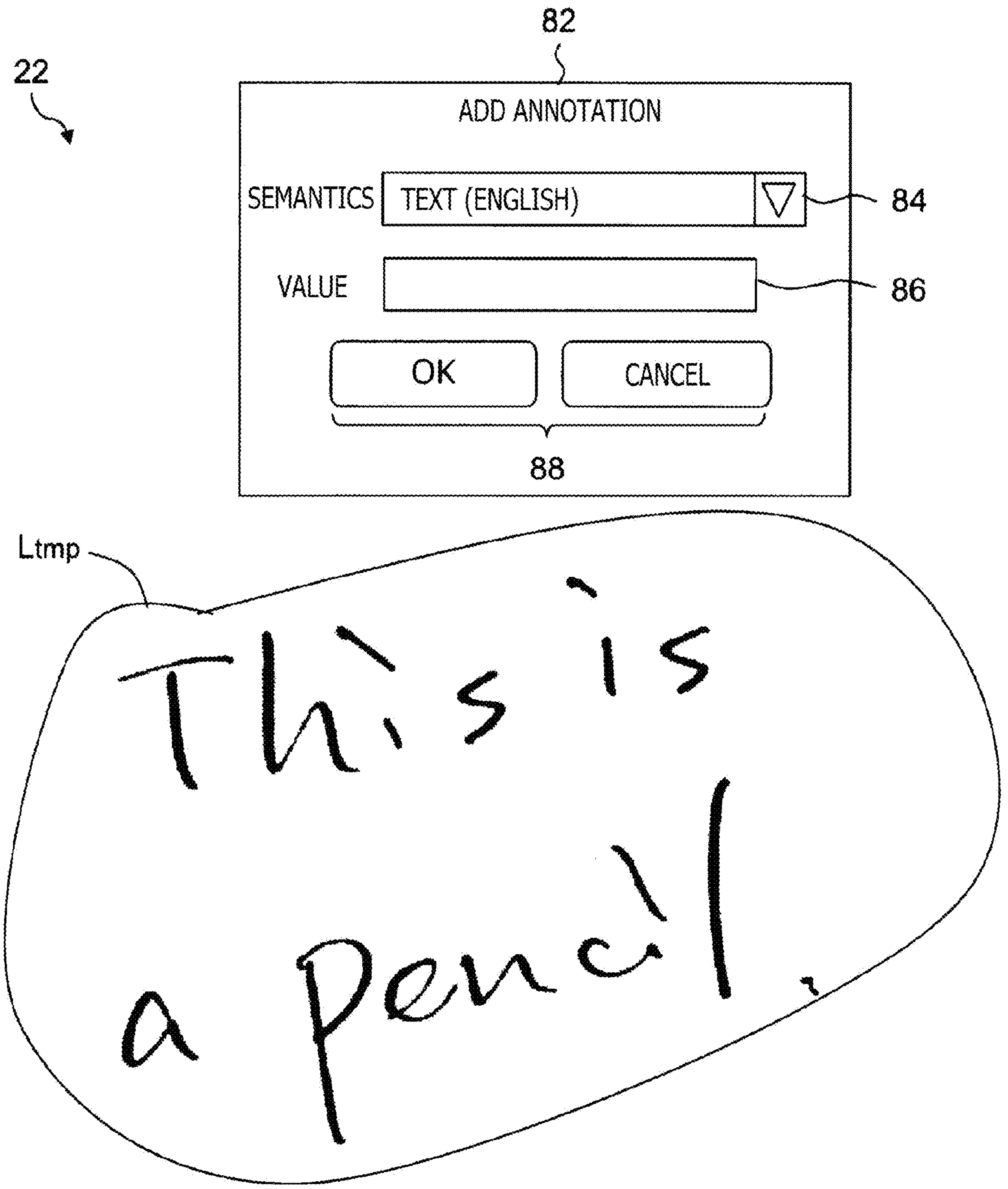
FIG. 8 is a diagram illustrating an example of a screen displayed in step S5 in FIG. 4.

As illustrated in FIG. 8, two user controls 84 and 86 and buttons 88 labeled as [OK] and [Cancel] are arranged in the input window 82. The first user control 84 is, for example, a pull-down menu configured to enable input of the semantics attribute. The second user control 86 is, for example, a text box configured to enable input of a value attribute.

If the input support mode is "ON," i.e., when control has passed through "step S3: ON" in FIG. 4, the semantics attribute obtained by the estimation at step S4 is displayed as an initial value (i.e., a recommended value) in an input box of the user control 84. Meanwhile, if the input support mode is "OFF," i.e., when control has passed through "step S3: OFF" in FIG. 4, an indication (e.g., a blank space) of no attribute being selected is displayed in the input box of the user control 84.

When a semantics attribute that corresponds to an intention of the user has been presented, the user can omit an operation on the user control 84. Meanwhile, when a semantics attribute that does not correspond to the intention of the user has been presented, the user may operate the user control 84 so as to select the intended attribute.

At step S6, the host processor 18 determines whether or not an operation of confirming the data input, more specifically, an operation of touching the [OK] button 88 (FIG. 8), has been accepted. If the confirming operation has not been accepted yet (step S6: NO), control stays at step S6 until this confirming operation is accepted. Meanwhile, if the confirming operation has been accepted (step S6: YES), control proceeds to step S7, which will be described below with reference to FIG. 11.

Figure 9:
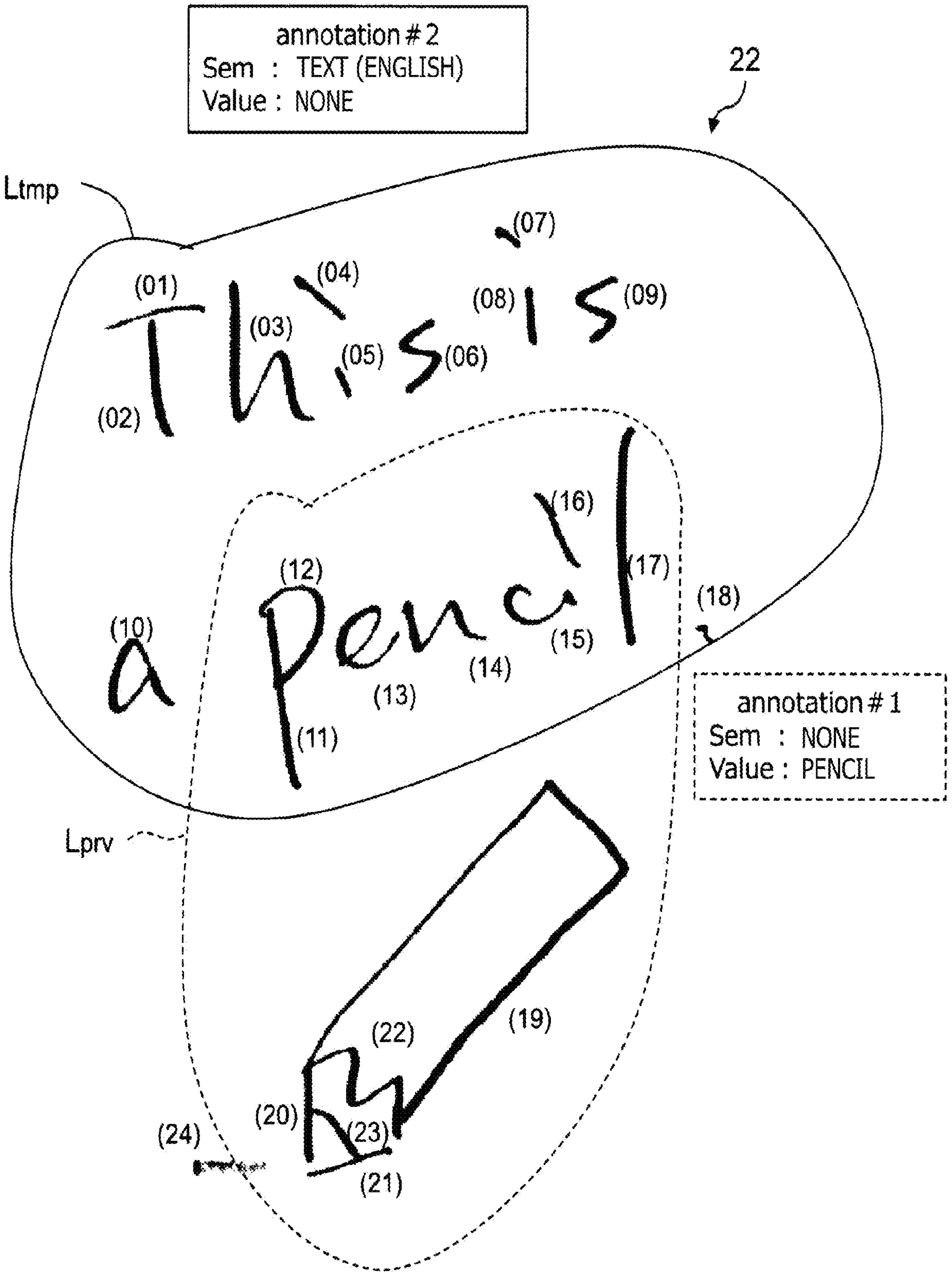
FIG. 9 is a diagram illustrating the positional relationships between the content and two lassos.

FIG. 9 is a diagram illustrating the positional relationships between the content and two lassos Lprv and Ltmp. It is assumed that the user performs a first annotation operation for a stroke set enclosed by the lasso Lprv, and thereafter performs a second annotation operation for a stroke set enclosed by the lasso Ltmp. By the first annotation operation, meta-information in which the semantics attribute (Sem) is "None" and the value attribute (Value) is "Pencil" is assigned to the set including the stroke elements with IDs=11-17 and 19-23. By the second annotation operation, meta-information in which the semantics attribute is "Text (English)" and the value attribute is "None" is assigned to the set including the stroke elements with IDs=01-18.

FIG. 10 is a diagram illustrating an example description of the ink data 50 corresponding to FIG. 9. The ink data 50 is made up of the stroke data 51 and metadata 52. The metadata 52 includes two meta-chunks 53 and 54. The first meta-chunk 53 describes the meta-information assigned to the stroke set indicated by the lasso Lprv. The second meta-chunk 54 describes the meta-information assigned to the stroke set indicated by the lasso Ltmp.

Effects by First Operation

As described above, the ink data generation apparatus 10 is an apparatus that generates the ink data 50 including the metadata 52 describing the meta-information regarding each of sets of strokes, the apparatus including: the first acquisition section 30 that acquires the new set data 42 representing the stroke elements belonging to the new set to which the meta-information has not been assigned yet; the attribute estimation section 34 that estimates the attribute to be assigned to the new set on the basis of the mutual relations between the positions or shapes of the plurality of strokes that form the new set; and the data generation section 38 that generates the meta-chunk 53 and 54 (i.e., first metadata) for assigning the attribute obtained by the estimation to the new set.

Meanwhile, a corresponding ink data generation method and a corresponding program cause one or a plurality of processors (e.g., the host processor 18) to perform: a first acquisition step (S2 in FIG. 4) of acquiring the new set data 42 representing the stroke elements belonging to the new set to which the meta-information has not been assigned yet; an estimation step (S4 in FIG. 4) of estimating the attribute to be assigned to the new set on the basis of the mutual relations between the positions or shapes of the plurality of strokes that form the new set; and a generation step (S10 or S11 in FIG. 11, which will be described below) of generating the meta-chunk 53 and 54 (i.e., the first metadata) for assigning the attribute obtained by the estimation to the new set.

The above configuration makes it possible to automatically select an attribute that is appropriate with a high probability by taking into account the mutual relations between the positions or shapes of the plurality of strokes, leading to a reduced burden when the user inputs the attribute.

In addition, the attribute estimation section 34 may be configured to include the discriminator 70 that accepts the input of the feature amounts concerning the starting and ending points of the strokes and outputs the label group of the semantics attributes. An improvement in accuracy in the estimation of the semantic attribute can be achieved by focusing on correlations between the starting and ending points of the strokes and semantic attributes.

Moreover, the ink data generation apparatus 10 may further include the UI section 28 configured to be capable of displaying a plurality of strokes simultaneously in a display area and to enable the stroke elements belonging to the new set to be selected from among the plurality of strokes based on a handwriting input by the user. The UI section 28 may further display the user control 84, which enables the input of the semantics attribute to be assigned to the new set, and the data generation section 38 may generate the meta-chunks 53 and 54 indicating the semantics attribute inputted by the user control 84. This enables smooth input of the semantics attribute using the user interface.

Furthermore, the UI section 28 may display the semantic attribute obtained by the estimation by the attribute estimation section 34 as the initial value of the user control 84. This will increase the probability that the need to perform an operation of changing the state of the user control 84 from an initial state thereof will be eliminated, while affording the user an opportunity to make a change thereto.

Second Operation of Ink Data Generation Apparatus 10

Next, a second operation of the ink data generation apparatus 10 will be described below with reference to a flowchart of FIG. 11 and FIGS. 12 to 17. This "second operation" means an operation of generating the ink data 50 on the basis of the meta-information inputted by the first operation. Here, the data generation section 38 performs "flow-type" data processing in which the ink data 50 is updated as necessary each time the meta-information is assigned.

Description of Second Operation

At step S7 in FIG. 11, the second acquisition section 32 acquires data (hereinafter referred to as the existing set data 44) representing stroke elements that belong to a set (hereinafter referred to as an existing set) of strokes to which the meta-information has already been assigned. Similarly to the new set data 42, the existing set data 44 is data capable of identifying the stroke elements, and may be, for example, stroke IDs, which are identification information for the strokes.

At step S8, using the new set data 42 acquired at step S2 in FIG. 4 and the existing set data 44 acquired at step S7, the set determination section 36 performs a determination as to an inclusion relation between the new set and the existing set by comparing the stroke elements of the new set data 42 and the stroke elements of the existing set data 44. Specifically, the set determination section 36 determines which of the following is true: (1) the existing set is a superset of the new set; (2) the existing set is a subset of the new set; and (3) there is not an inclusion relation therebetween. It should be noted that, in the case where there are a plurality of existing sets, the set determination section 36 performs the determination as to the inclusion relation with respect to each of the existing sets.

At step S9, the set determination section 36 determines whether or not there is an existing set that has an inclusion relation with the new set.

Figure 12:
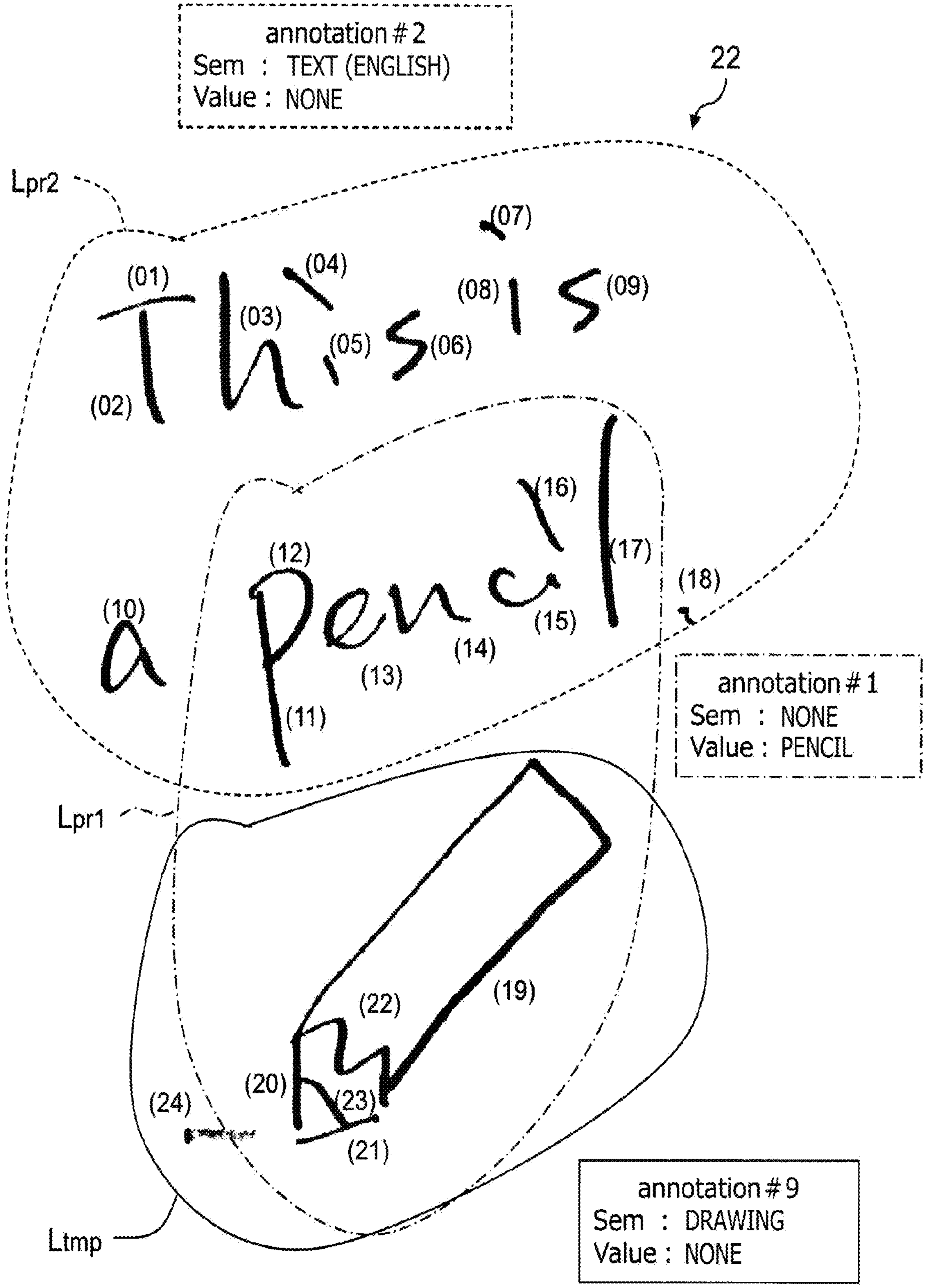
FIG. 12 is a diagram illustrating the positional relationships between the content and three lassos.

FIG. 12 is a diagram illustrating the positional relationships between the content and three lassos Lpr1, Lpr2, and Ltmp. It is assumed here that the user performs a ninth annotation operation for a stroke set enclosed by the lasso Ltmp after performing the first to eighth annotation operations. By the ninth annotation operation, meta-information in which the semantics attribute (Sem) is "Drawing" and the value attribute (Value) is "None" is assigned to the set including the stroke elements with IDs=19-24. For the sake of convenience in illustration, depiction of third to eighth lassos is omitted.

As will be understood from the present drawing, an existing set specified by the lasso Lpr1 (i.e., the first annotation operation) includes the stroke elements with IDs=19-23, but does not include the stroke element with ID=24. Meanwhile, an existing set specified by the lasso Lpr2 (i.e., the second annotation operation) does not include the stroke elements with IDs=19-24. In this case, it is determined that there is not an inclusion relation between the new set and any existing set (step S9: NO), and control proceeds to step S10.

At step S10, the data generation section 38 generates a meta-chunk 55 describing the meta-information, the input of which has been confirmed at step S6 in FIG. 4, and places the meta-chunk 55 at a position according to a predetermined order of meta-information assignment.

FIG. 13 is a diagram illustrating an example description of the ink data 50 corresponding to FIG. 12. The ink data 50 is made up of the stroke data 51 and metadata 52A. The metadata 52A is made up of nine meta-chunks including the meta-chunks 53, 54, and 55. The first meta-chunk 53 describes the meta-information assigned to the existing set specified by the lasso Lpr1. The second meta-chunk 54 describes the meta-information assigned to the existing set specified by the lasso Lpr2. The ninth meta-chunk 55 describes the meta-information assigned to the new set specified by the lasso Ltmp. For the sake of convenience in illustration, illustration of the third to eighth meta-chunks is omitted.

In the example of the present drawing, a rule stipulating that meta-information newly assigned should be added at a lower position one item after another is provided, and accordingly, the ninth meta-chunk 55 is added at a bottom of the metadata 52. In the case where, in contrast to the example of the present drawing, a rule stipulating that meta-information newly assigned should be added at an upper position one item after another is provided, the meta-chunk 55 is added at a top of the metadata 52.

Figure 14:
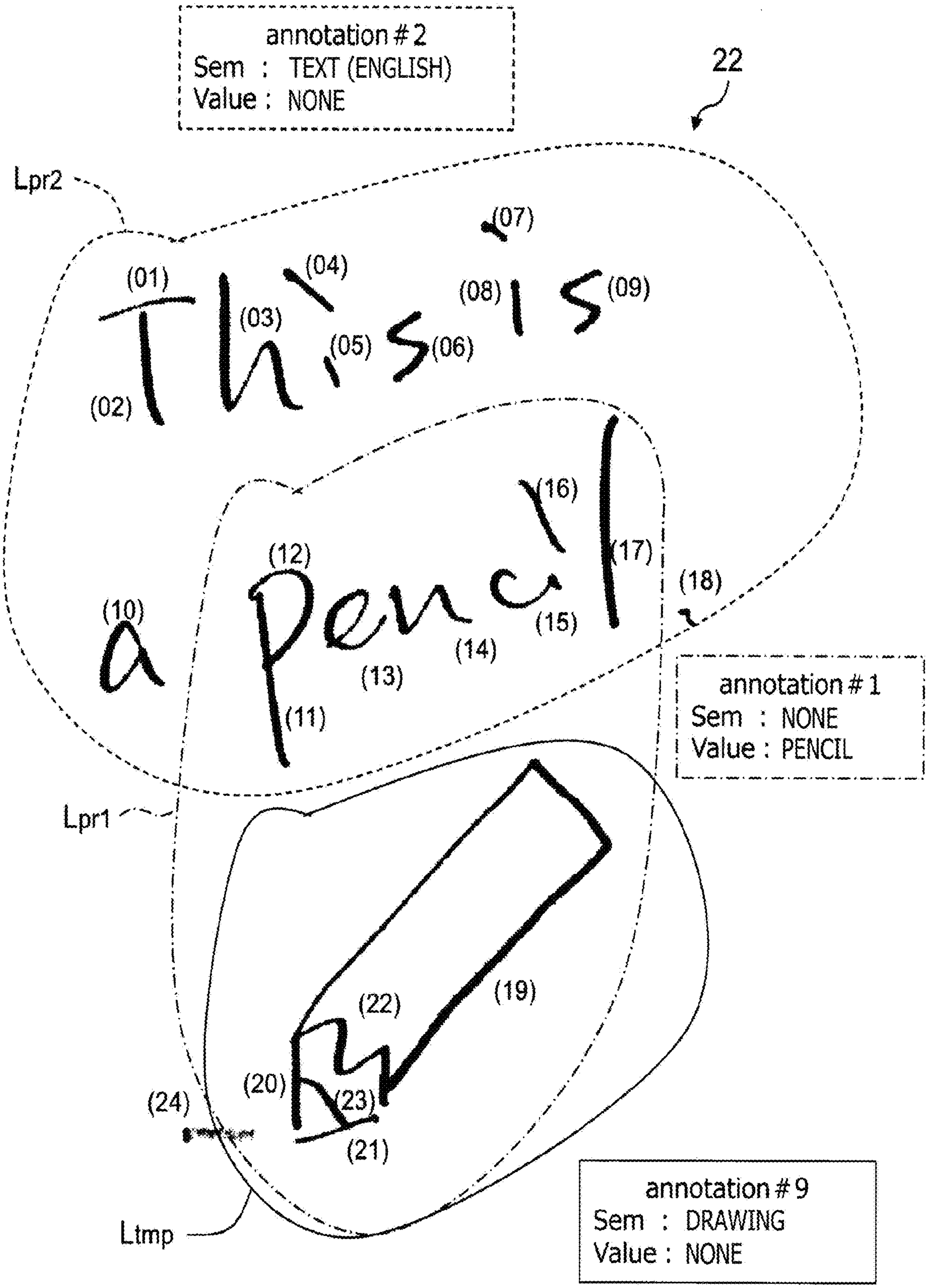
FIG. 14 is a diagram illustrating the positional relationships between the content and three lassos.

Meanwhile, FIG. 14 is a diagram illustrating the positional relationships between the content and three lassos Lpr1, Lpr2, and Ltmp. FIG. 14 is different from FIG. 12 only in the region specified by the lasso Ltmp. By the ninth annotation operation, meta-information in which the semantics attribute is "Drawing" and the value attribute is "None" is assigned to a set including the stroke elements with IDs=19-23.

As will be understood from the present drawing, the existing set specified by the lasso Lpr1 includes all the stroke elements (IDs=19-23), and therefore corresponds to a "superset" of the new set. Accordingly, it is determined that there is an inclusion relation between the new set and the existing set (step S9: YES), and control proceeds to step S11.

At step S11, the data generation section 38 generates a meta-chunk 56, 57, or 58 (i.e., the first metadata) so as to be dependent on the meta-chunk 54 (i.e., second metadata) of the existing set which is a superset or subset of the new set. A specific example of a method of generating the meta-chunk 56, 57, or 58 will now be described below with reference to FIGS. 15 to 17.

FIG. 15 is a diagram illustrating a first example description of the ink data 50 corresponding to FIG. 14. The ink data 50 is made up of the stroke data 51 and metadata 52B. The metadata 52B is made up of nine meta-chunks including the meta-chunks 53, 54, and 56. Description of the meta-chunks 53 and 54, which are not changed from those in FIG. 13, is omitted.

The ninth meta-chunk 56 describes the meta-information assigned to the new set specified by the lasso Ltmp. In the example of the present drawing, the ninth meta-chunk 56 is added so as to be incorporated in the meta-chunk 53 despite the rule stipulating that meta-information newly assigned should be added at a lower position one item after another.

As described above, in the case where it has been determined that there is an inclusion relation between the new set and any existing set, the data generation section 38 may generate the meta-chunk 56 for the new set at a position within the meta-chunk 53 for that existing set. This example description enables the meta-chunks 53 and 56 having an inclusion relation therebetween to be associated with each other when generating the ink data 50.

FIG. 16 is a diagram illustrating a second example description of the ink data 50 corresponding to FIG. 14. The ink data 50 is made up of the stroke data 51 and metadata 52C. The metadata 52C is made up of nine meta-chunks including the meta-chunks 53, 54, and 57. Description of the meta-chunks 53 and 54, which are not changed from those in FIG. 13, is omitted.

The ninth meta-chunk 57 describes the meta-information assigned to the new set specified by the lasso Ltmp. In the example of the present drawing, the ninth meta-chunk 56 is added at a position immediately below the meta-chunk 53 (immediately above the meta-chunk 54) despite the rule stipulating that meta-information newly assigned should be added at a lower position one item after another.

As described above, in the case where it has been determined that there is an inclusion relation between the new set and any existing set, the data generation section 38 may generate the meta-chunk 57 for the new set at a position immediately above or immediately below the meta-chunk 53 for that existing set. This example description enables the meta-chunks 53 and 57 having an inclusion relation therebetween to be associated with each other when generating the ink data 50.

FIG. 17 is a diagram illustrating a third example description of the ink data 50 corresponding to FIG. 14. The ink data 50 is made up of the stroke data 51 and metadata 52D. The metadata 52D is made up of nine meta-chunks including the meta-chunks 53, 54, and 58. Description of the meta-chunks 53 and 54, which are not changed from those in FIG. 13, is omitted.

The ninth meta-chunk 58 describes the meta-information assigned to the new set specified by the lasso Ltmp. In the example of the present drawing, the ninth meta-chunk 58 is added at a bottom of the metadata 52D in accordance with the rule stipulating that meta-information newly assigned should be added at a lower position one item after another. However, the meta-chunk 58 is described in a form having a reference to an identification code (here, group ID=g1) of the stroke set included in the meta-chunk 53 in <trace View> tags.

As described above, in the case where it has been determined that there is an inclusion relation between the new set and any existing set, the data generation section 38 may generate the meta-chunk 58 for the new set in a form that refers to the identification code of the existing set included in the meta-chunk 53. This example description enables the meta-chunks 53 and 58 having an inclusion relation therebetween to be associated with each other when generating the ink data 50.

After the data generation section 38 generates the meta-chunk 55, 56, 57, or 58 described in a form that varies in accordance with a result of the determination at step S8 as described above (step S10 or S11), control proceeds to the next step S12.

Figure 11:
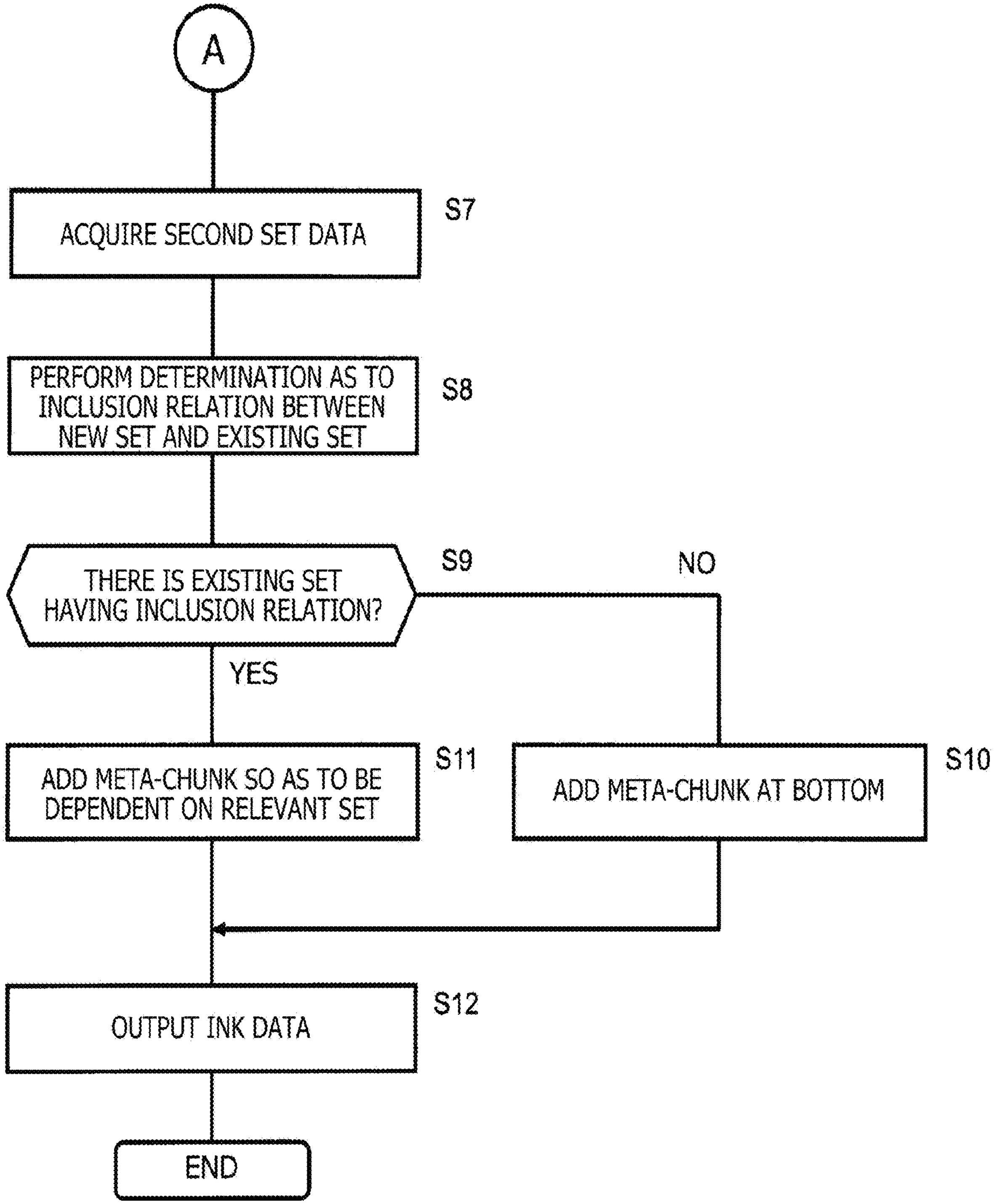
FIG. 11 is a second flowchart for describing an operation of the ink data generation apparatus illustrated in FIG. 1.

At step S12 in FIG. 11, the data generation section 38 outputs the ink data 50 generated/updated at step S10 or S11. Specific examples of this "output" include storage into the memory 20, writing into a data file, and transmitting to an external device. The operation of the ink data generation apparatus 10 is thus completed.

Effects by Second Operation

As described above, the ink data generation apparatus 10 is an apparatus that generates the ink data 50 including the metadata 52 describing the meta-information regarding each of sets of strokes, the apparatus including: the first acquisition section 30 that acquires the new set data 42 (i.e., the first set data) representing the stroke elements belonging to the new set (i.e., the first set) to which the meta-information has not been assigned yet; the second acquisition section 32 that acquires the existing set data 44 (i.e., the second set data) representing the stroke elements belonging to the existing set (i.e., a second set) to which the meta-information has already been assigned on a per stroke set basis; the set determination section 36 that performs a determination as to the inclusion relation between the new set and the existing set by comparing the stroke elements of the new set data 42 and the stroke elements of the existing set data 44 using the acquired new set data 42 and the acquired existing set data 44; and the data generation section 38 that generates the first metadata (i.e., the meta-chunk 55, 56, 57, or 58) for the new set described in a form that varies in accordance with the result of the determination performed by the set determination section 36.

Meanwhile, a corresponding ink data generation method and a corresponding program cause one or a plurality of processors (e.g., the host processor 18) to perform: the first acquisition step (S2 in FIG. 4) of acquiring the new set data 42 representing the stroke elements belonging to the new set to which the meta-information has not been assigned yet; a second acquisition step (S7) of acquiring the existing set data 44 representing the stroke elements belonging to the existing set to which the meta-information has already been assigned on a per stroke set basis; a determination step (S8) of performing a determination as to the inclusion relation between the new set and the existing set by comparing the stroke elements of the new set data 42 and the stroke elements of the existing set data 44 using the acquired new set data 42 and the acquired existing set data 44; and a generation step (S10 or S11) of generating the meta-chunk 55, 56, 57, or 58 described in a form that varies in accordance with the result of the determination at the determination step.

The above configuration enables recognizing the inclusion relation between the sets of strokes by analyzing the description form of the metadata 52, which makes it possible to perform various processes that take into account the recognized inclusion relation, such as editing support (e.g., cross-referencing of meta-information), automatic editing (e.g., combining/substitution/inheritance of meta-information), etc., on the meta-information. This leads to an improved ease of handling the ink data 50 when or after the metadata 52 is generated.

In addition, when it has been determined that there is an inclusion relation between the existing set and the new set, the data generation section 38 may generate the meta-chunk 56, 57, or 58 so as to be dependent on the meta-chunk 53 for the existing set which is a superset or a subset. The inclusion relation therebetween is made easier to recognize by configuring a dependence relationship between the meta-chunks 53 and 56-58.

Modification

An example of generating ink data 60 for which WILL is used as an ink markup language in accordance with a notation of JSON will now be described below.

Example of Generation of Ink Data 60

Figure 18:
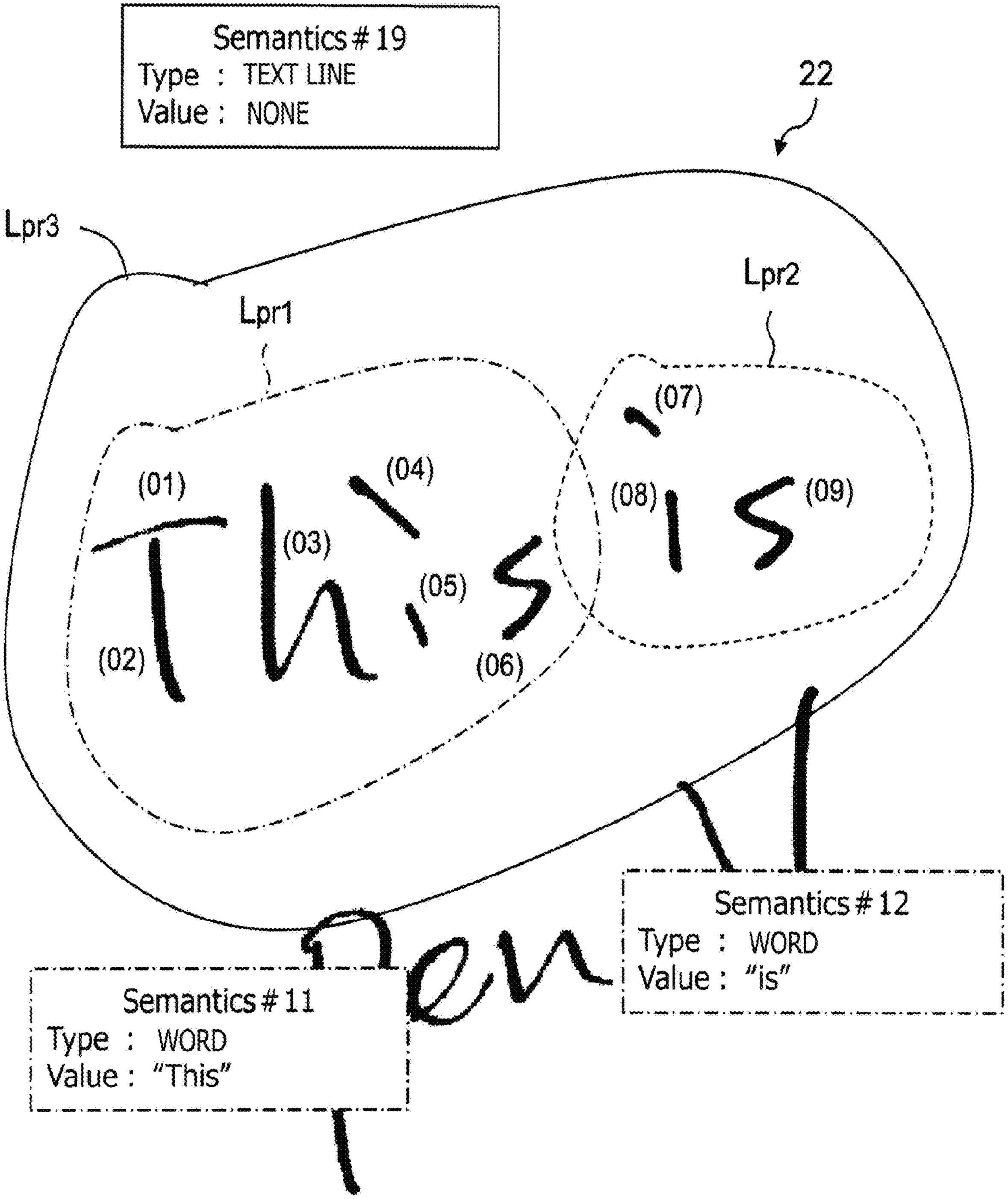
FIG. 18 is a diagram illustrating the positional relationships between the content and three lassos.

FIG. 18 is a diagram illustrating the positional relationships between the content and three lassos Lpr1, Lpr2, and Lpr3. It is assumed that the user performs an eleventh annotation operation for a stroke set enclosed by the lasso Lpr1, and performs a twelfth annotation operation for a stroke set enclosed by the lasso Lpr2. By the eleventh annotation operation, meta-information in which the type (Type) is "Word" and the value (Value) is "This" is assigned to the set including the stroke elements with IDs=01-06. By the twelfth annotation operation, meta-information in which the type is "Word" and the value is "is" is assigned to the set including the stroke elements with IDs=07-09.

It is assumed that, after performing the eleventh to eighteenth annotation operations, the user performs a nineteenth annotation operation for a stroke set enclosed by the lasso Lpr3. By the nineteenth annotation operation, meta-information in which the type is "Text Line" and the value is "None" is assigned to the set including the stroke elements with IDs=01-09. For the sake of convenience in illustration, depiction of thirteenth to eighteenth lassos is omitted.

Here, the data generation section 38 performs "stock-type" data processing in which the ink data 60 is collectively updated at a predetermined timing after accumulating items of meta-information assigned by the user. In this case, the data generation section 38 acquires the result of the determination performed by the set determination section 36, and, when the above-described inclusion relation is satisfied, generates the ink data 60 so as to include a meta-chunk 65 describing relevant meta-information in a hierarchical manner. In addition, the data generation section 38 may determine meta-information that has not been assigned yet from a relation with meta-information already assigned to a superset or a subset, and automatically add a code statement 68 for assigning the determined meta-information.

FIG. 19 is a diagram illustrating an example description of the ink data 60 corresponding to FIG. 18. The ink data 60 includes stroke data 61 describing strokes and stroke sets, and metadata 62 describing semantics attributes. The metadata 62 is made up of nine meta-chunks including meta-chunks 63, 64, and 65. The eleventh meta-chunk 63 describes the meta-information assigned to the set (tg11) specified by the lasso Lpr1. The twelfth meta-chunk 64 describes the meta-information assigned to the set (tg12) specified by the lasso Lpr2.

The nineteenth meta-chunk 65 describes the meta-information assigned to the set (tg19) specified by the lasso Lpr3. In the example of the present drawing, the nineteenth meta-chunk 65 is added at a bottom of the metadata 62 in accordance with the rule stipulating that meta-information newly assigned should be added at a lower position one item after another. However, hierarchizing data 66 that defines the two sets (tg11 and tg12) as subsets using "has_subgroup" is added in the meta-chunk 65.

In addition, a code statement 68 indicating that the value of the superset (tg19) is "This is" is added in the meta-chunk 65. This "This is" is a character string obtained by combining the value of the subset (tg11), "This," and the value of the subset (tg12), "is."

Figure 20:
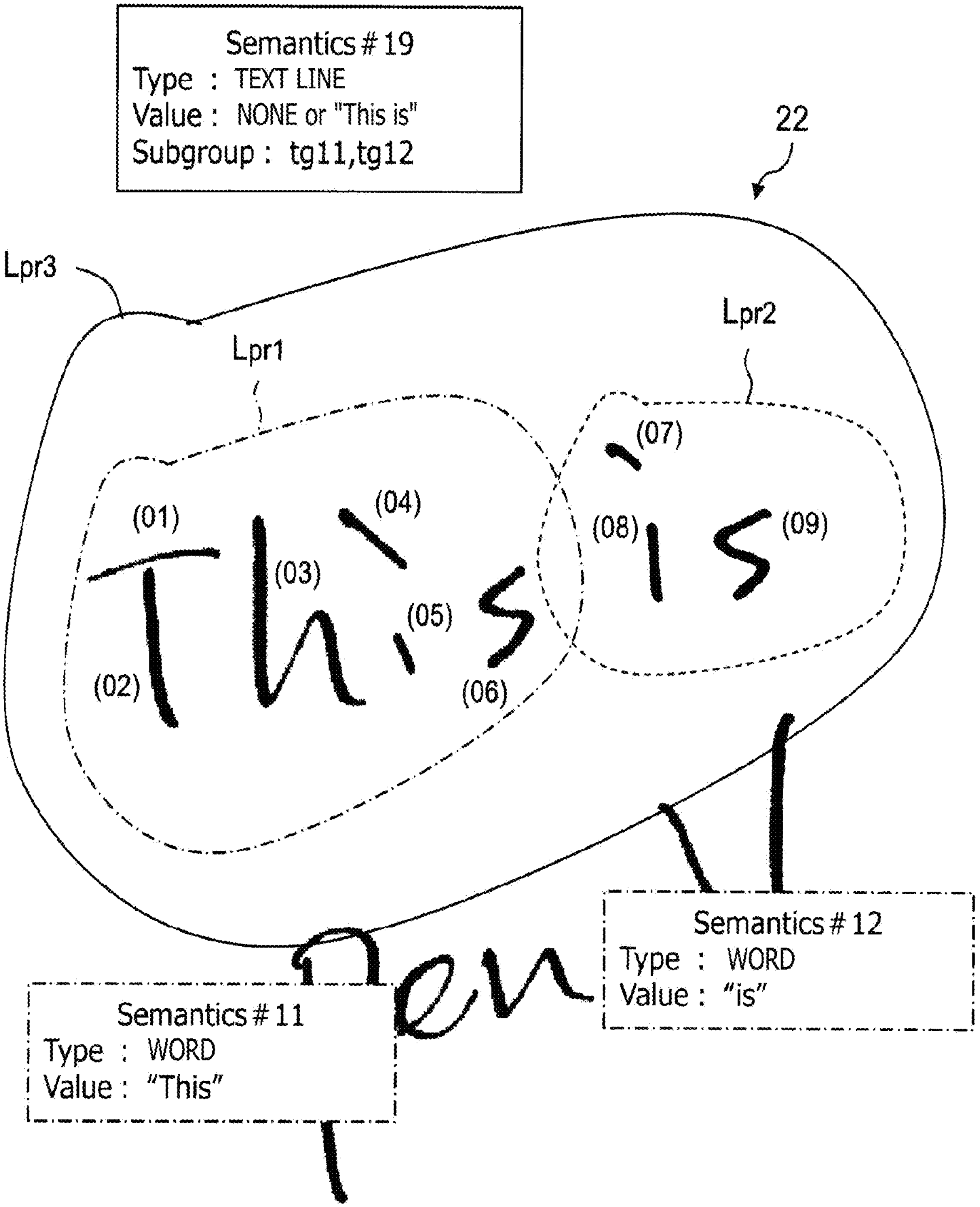
FIG. 20 is a diagram illustrating results of assigning semantics attributes.

As a result, as illustrated in FIG. 20, to the set (tg19) including the stroke elements with IDs=01-09, "Type: Text Line" is assigned as meta-information, and "Value: This is" and "Subgroup: tg11, tg12" are automatically assigned as meta-information. In the example of the present drawing, the meta-information "This is" is automatically assigned when the value is "None," but the meta-information does not have to be assigned depending on the intention of the user.

As described above, in the case where it has been determined that there is an inclusion relation between the first set (tg19) and the second set (tg11 or tg12), the data generation section 38 may generate the meta-chunk 65 for the first set in a form that refers to the identification code of the second set (tg11 or tg12). This example description enables the meta-chunks 63 to 65 having an inclusion relation therebetween to be associated with one another when generating the ink data 60.

Effects by Modification

As described above, the ink data generation apparatus 10 is an apparatus that generates the ink data 60 including the metadata 62 describing the meta-information regarding each of sets of strokes, the apparatus including: the data acquisition section (i.e., the first acquisition section 30 and the second acquisition section 32) that acquires the set data (i.e., the new set data 42 and the existing set data 44) representing stroke elements belonging to a set of strokes on a set-by-set basis; and the data output section (i.e., the data generation section 38) that outputs the ink data 60 including the metadata 62 indicating an inclusion relation between a plurality of sets on the basis of the set data acquired on a set-by-set basis.

Meanwhile, a corresponding ink data generation method and a corresponding program cause one or a plurality of processors (e.g., the host processor 18) to perform: an acquisition step (S2 in FIGS. 4 and S7 in FIG. 11) of acquiring the set data representing stroke elements belonging to a set of strokes on a set-by-set basis; and an output step (S12 in FIG. 11) of outputting the ink data 60 including the metadata 62 indicating an inclusion relation between a plurality of sets on the basis of the set data acquired on a set-by-set basis.

The above configuration enables recognizing the inclusion relation between the sets of strokes by analyzing the content of the outputted metadata 62, which makes it possible to perform various processes that take into account the recognized inclusion relation, such as editing support, automatic editing, etc., on the meta-information. This leads to an improved ease of handling the ink data 60 when or after the metadata 62 is outputted.

In addition, the data output section may output the metadata including the meta-chunk 65, which describes a semantics attribute based on a data structure indicating the inclusion relation between the sets.

DESCRIPTION OF REFERENCE SYMBOLS

10: Ink data generation apparatus, 12: Touchscreen display, 18: Host processor, 20: Memory, 28: UI section, 30: First acquisition section, 32: Second acquisition section, 34: Attribute estimation section, 36: Set determination section, 38: Data generation section (data output section), 40: Drawing processing section, 42: New set data (first set data), 44: Existing set data (second set data), 50, 60: Ink data, 51, 61: Stroke data, 52 (A/B/C/D), 62: Metadata, 53, 54, 65: Meta-chunk (second metadata), 55 to 58, 63, 64: Meta-chunk (first metadata)

The invention claimed is:

1. A digital ink generation device that generates digital ink including metadata describing meta-information for each set of strokes, comprising:

a first acquisition section that acquires first set data indicating stroke elements belonging to a first set to which meta-information has not been assigned;

a second acquisition section that acquires second set data indicating stroke elements belonging to a second set to which meta-information has been assigned for each set of strokes;

a set determination unit that determines an inclusion relationship between the first set and the second set using the first set data acquired by the first acquisition unit and the second set data acquired by the second acquisition unit; and a data generation unit that generates first metadata for the first set based on second metadata of the second set in case the inclusion relationship is determined to exist between the first set and the second set.

2. The digital ink generation device according to claim 1, wherein the data generation unit generates the first metadata by referring to an identification code of the second set in case the inclusion relationship is determined to exist between the first set and the second set.

3. The digital ink generation device according to claim 1, wherein the data generation unit generates the first metadata at a position according to a predetermined order of meta-information assignment order when it is determined that there is no inclusion relationship between the first set and the second set.

4. The digital ink generation device according to claim 1, further comprising an attribute estimation unit that estimates attributes to be assigned to the first set based on positional or shape relationships of multiple strokes constituting the first set.

5. The digital ink generation device according to claim 4, wherein the attribute estimation unit includes a classifier that inputs features related to endpoints of the strokes and outputs label values for semantic attributes.

6. The digital ink generation device according to claim 5, further comprising a UI unit configured to simultaneously display multiple strokes in a display area and to allow the stroke elements belonging to the first set to be selected from the multiple strokes through handwritten input by a user, wherein the UI unit further displays user controls for inputting semantic attributes to be assigned to the first set, and the data generation unit generates the first metadata indicating the semantic attributes input via the user controls.

7. The digital ink generation device according to claim 6, wherein the UI unit displays the semantic attributes estimated by the attribute estimation unit as initial values for the user controls.

8. A digital ink generation device that generates digital ink including metadata describing meta-information for each set of strokes, comprising:

a data acquisition unit that acquires set data indicating stroke elements belonging to sets of strokes, respectively; and a data output unit that outputs metadata indicating inclusion relationships between the sets of strokes based on the set data acquired by the data acquisition unit.

9. The digital ink generation device according to claim 8, wherein the data output unit outputs the metadata including a meta-chunk that describes semantic attributes using a data structure indicating the inclusion relationships between the sets of strokes.

10. A digital ink generation method for generating digital ink including metadata describing meta-information for each set of strokes, comprising:

a first acquisition step of acquiring first set data indicating stroke elements belonging to a first set to which meta-information has not been assigned;

a second acquisition step of acquiring second set data indicating stroke elements belonging to a second set to which meta-information has been assigned for each set of strokes;

a determination step of determining an inclusion relationship between the first set and the second set using the first set data and the second set data; and a generation step of generating first metadata for the first set based on second metadata of the second set in case the inclusion relationship is determined to exist between the first set and the second set.

11. A digital ink generation program for generating digital ink including metadata describing meta-information for each set of strokes, the digital ink generation program causing one or a plurality of computers to perform:

a first acquisition step of acquiring first set data indicating stroke elements belonging to a first set to which meta-information has not been assigned;

a second acquisition step of acquiring second set data indicating stroke elements belonging to a second set to which meta-information has been assigned, for each set of strokes;

a determination step of determining an inclusion relationship between the first set and the second set using the first set data and the second set data; and a generation step of generating first metadata for the first set based on second metadata of the second set in case the inclusion relationship is determined to exist between the first set and the second set.

* * * * *